(12) United States Patent
Pan et al.

(10) Patent No.: US 12,745,150 B2
(45) Date of Patent: Sep. 22, 2026

(54) HANDOVER METHOD, APPARATUS, AND SYSTEM

(71) Applicant: Huawei Technologies Co., Ltd., Shenzhen (CN)

(72) Inventors: Qi Pan, Beijing (CN); Zhenglei Huang, Shenzhen (CN); Hui Ni, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 170 days.

(21) Appl. No.: 18/764,628

(22) Filed: Jul. 5, 2024

(65) Prior Publication Data

US 2024/0365191 A1 Oct. 31, 2024

Related U.S. Application Data

(63) Continuation of application No. PCT/CN2023/070314, filed on Jan. 4, 2023.

(30) Foreign Application Priority Data

Jan. 7, 2022 (CN) ......................... 202210018463.5

(51) Int. Cl.
*H04W 36/08* (2009.01)
*H04W 36/00* (2009.01)
*H04W 40/36* (2009.01)

(52) U.S. Cl.
CPC ....... *H04W 36/08* (2013.01); *H04W 36/0033* (2013.01); *H04W 40/36* (2013.01)

(58) Field of Classification Search
CPC ......... H04W 36/0033; H04W 36/0009; H04W 40/36; H04W 36/08; H04W 12/00
See application file for complete search history.

(56) References Cited

U.S. PATENT DOCUMENTS 10,708,824 B2 * 7/2020 Lee ....................... H04W 36/38
10,945,261 B2 * 3/2021 Wu ....................... H04W 76/22
(Continued)

FOREIGN PATENT DOCUMENTS

CN 110720238 A 1/2020
CN 110753314 A 2/2020
(Continued)

OTHER PUBLICATIONS

3GPP TSG-RAN WG3 #102 R3-186751, "Inter-donor topology adaptation for architecture 1a," LG Electronics Inc, Spokane, WA, USA, Nov. 12-16, 2018, total 7 pages, XP051558513.
(Continued)

*Primary Examiner* — Syed Ali
(74) *Attorney, Agent, or Firm* — Slater Matsil, LLP

(57) ABSTRACT

Embodiments of this application provide a handover method. The method is performed by an access network device, and includes: determining that at least one terminal device is handed over from a first access network device to a second access network device, where the at least one terminal device accesses a network by using an IAB node; and sending first request information, where the first request information notifies a first access and mobility management function AMF network element to perform path handover on the at least one terminal device, and the first AMF network element serves the at least one terminal device. The first request information includes at least one first request message, and the at least one first request message is in one-to-one correspondence with the at least one terminal device.

14 Claims, 11 Drawing Sheets

(56) References Cited

U.S. PATENT DOCUMENTS

| | | | | |
|---|---|---|---|---|
| 11,019,536 | B2 * | 5/2021 | Yuan | H04W 76/30 |
| 11,729,675 | B2 * | 8/2023 | Chong | H04W 36/0033 455/436 |
| 12,604,347 | B2 * | 4/2026 | Wang | H04W 36/0055 |
| 2013/0083721 | A1 | 4/2013 | Wu et al. | |
| 2020/0053617 | A1 * | 2/2020 | Park | H04W 8/02 |
| 2020/0196200 | A1 * | 6/2020 | Lu | H04W 36/00226 |
| 2021/0250838 | A1 * | 8/2021 | Lu | H04W 76/11 |
| 2022/0078677 | A1 * | 3/2022 | Yin | H04W 36/06 |
| 2022/0361072 | A1 * | 11/2022 | Zhu | H04L 61/5014 |
| 2023/0117232 | A1 * | 4/2023 | Thanneeru | H04W 36/0079 370/331 |
| 2023/0262790 | A1 * | 8/2023 | Liu | H04W 76/11 370/329 |
| 2023/0269630 | A1 | 8/2023 | Teyeb et al. | |
| 2026/0019902 | A1 * | 1/2026 | Zhuo | H04W 36/08 |

FOREIGN PATENT DOCUMENTS

| | | | |
|---|---|---|---|
| CN | 110050483 | B | 10/2020 |
| KR | 20230170788 | A | 12/2023 |
| WO | 2014124558 | A1 | 8/2014 |
| WO | 2018205100 | A1 | 11/2018 |
| WO | 2021121113 | A1 | 6/2021 |
| WO | 2023187662 | A1 | 10/2023 |

OTHER PUBLICATIONS

3GPP TSG-RAN WG3 Meeting #109e R3-204917, "Inter-Donor CU topology adaptation," Lenovo, Motorola Mobility, Online, Aug. 17-28, 2020, total 4 pages, XP052397989.

3GPP TS 23.501 V17.3.0 (Dec. 2021), 3rd Generation Partnership Project; Technical Specification Group Services and System Aspects; System architecture for the 5G System (5GS); Stage 2 (Release 17), total 559 pages.

3GPP TS 23.502 V17.3.0 (Dec. 2021), 3rd Generation Partnership Project; Technical Specification Group Services and System Aspects; Procedures for the 5G System (5GS); Stage 2 (Release 17), total 727 pages.

3GPP TR 22.839 V18.1.0 (Dec. 2021), 3rd Generation Partnership Project; Technical Specification Group Services and System Aspects; Study on Vehicle-Mounted Relays; Stage 1 (Release 18), total 58 pages.

Qualcomm, S2-2104762, Rel-18 new SID: Motivation for study of Architecture Enhancements for Vehicle Mounted Relays (FS_VMR_ARC), May 17-28, 2021, total 9 pages.

SA WG2 Meeting #S2-150e(e-meeting), S2-2202216, "Solution for mobility", Ericsson, Apr. 6-12, 2022, Electronic Meeting, total 6 pages.

* cited by examiner

HANDOVER METHOD, APPARATUS, AND SYSTEM

CROSS-REFERENCE TO RELATED APPLICATIONS

This application is a continuation of International Application No. PCT/CN2023/070314, filed on Jan. 4, 2023, which claims priority to Chinese Patent Application No. 202210018463.5, filed on Jan. 7, 2022. The disclosures of the aforementioned applications are hereby incorporated by reference in their entireties.

TECHNICAL FIELD

Embodiments of this application relate to the communication field, and specifically, to a handover method, an apparatus, and a system.

BACKGROUND

To meet an ultra-high capacity requirement of a 5th generation (5G) mobile communication system, high-frequency small cell networking becomes a mainstream. A high-frequency carrier has a relatively poor propagation characteristic, is severely attenuated due to blocking, and has small coverage. Therefore, a large quantity of small cells need to be densely deployed. Correspondingly, it is costly to provide fiber backhaul for the large quantity of densely deployed small cells, which are difficult to construct. Therefore, a cost-effective and convenient backhaul solution is required. In addition, to meet a wide coverage requirement, network coverage needs to be provided in some remote areas, but fiber deployment is difficult and costly. Therefore, a flexible and convenient access and backhaul solution also needs to be designed. An integrated access and backhaul (IAB) technology provides a solution to the foregoing problems.

In a current scenario, an IAB node is mainly deployed at a fixed location without considering mobility of the IAB node. With development of mobile communication networks, a mobile scenario is one of important 5G scenarios. The IAB node can provide wireless backhaul, and therefore can improve network coverage and capacity in the mobile scenario. Therefore, the IAB node may alternatively be deployed on a mobile device (for example, a car, a high-speed railway, or a subway), and move with the mobile device.

User equipment (UE) moves with the IAB node. When the IAB node is handed over between IAB donor nodes, UEs of the JAB node are handed over collectively, causing a severe signaling storm.

Therefore, how to ensure group handover in a unit of a user group in a mobile IAB node, to reduce signaling impact and signaling overheads for a core network, and ensure UE service continuity is a problem to be urgently resolved currently.

SUMMARY

Embodiments of this application provide a handover method, to ensure group handover in a unit of a user group in a mobile first device, reduce signaling impact and signaling overheads for a core network, and ensure UE service continuity.

According to a first aspect, a terminal device handover method for a first device is provided. The method includes: determining that at least one terminal device is handed over from a first access network device to a second access network device, where the at least one terminal device accesses a network by using the first device; and sending first request information, where the first request information notifies a first access and mobility management network element to perform path handover on the at least one terminal device, and the first mobility management network element serves the at least one terminal device. The first request information includes at least one first request message, and the at least one first request message is in one-to-one correspondence with the at least one terminal device.

It should be noted that the first device may be an IAB node, or may be a mobile satellite node. It should be understood that this is not limited in embodiments of this application.

Based on the foregoing technical solution, an access network device determines that the first device and the at least one terminal device of the first device are handed over from the first access network device to the second access network device, and sends the first request information to the first mobility management network element corresponding to the at least one terminal device, to indicate the first mobility management network element to perform group handover on the at least one terminal device in a unit of a user group. This ensures group handover in a unit of a user group in the first device, reduces signaling impact and signaling overheads for a core network, and ensures UE service continuity.

With reference to the first aspect, in some implementations of the first aspect, the method further includes: obtaining first device identification information, where the first device identification information identifies the first device. Based on the foregoing technical solution, a user group of the first device can be determined based on an identifier of the first device, to ensure group handover in a unit of a user group, reduce signaling impact and signaling overheads for a core network, and ensure UE service continuity.

With reference to the first aspect, in some implementations of the first aspect, the method further includes: determining a same first mobility management network element for the at least one terminal device based on the first device identification information. Based on the foregoing technical solution, a same first mobility management network element can be selected as much as possible for user groups of the first device, to ensure group handover in a unit of a user group in the first device, reduce signaling impact and signaling overheads for a core network, and ensure UE service continuity.

With reference to the first aspect, in some implementations of the first aspect, the method further includes: storing a correspondence between the first device identification information, identification information of the at least one terminal device, and identification information of the first mobility management network element; and the sending first request information includes: sending the first request information to the first mobility management network element based on the correspondence. Based on the foregoing technical solution, group handover in a unit of a user group serving the first mobility management network element of the first device can be performed subsequently, to ensure group handover in a unit of a user group in the first device node, reduce signaling impact and signaling overheads for a core network, and ensure UE service continuity.

With reference to the first aspect, in some implementations of the first aspect, the first request information includes the identification information of the at least one terminal device. Based on the foregoing technical solution, it can be ensured that the first mobility management network element learns of user identification information of the first device, to ensure group handover in a unit of a user group in the first device, reduce signaling impact and signaling overheads for a core network, and ensure UE service continuity.

With reference to the first aspect, in some implementations of the first aspect, the method further includes: sending a correspondence between the identification information of the at least one terminal device and the identification information of the first mobility management network element to a second mobility management network element, where the second mobility management network element serves the first device. Based on the foregoing technical solution, the second mobility management network element can sense a user group serving the first mobility management network element of the first device, to ensure group handover in a unit of a user group in the first device node, reduce signaling impact and signaling overheads for a core network, and ensure UE service continuity.

With reference to the first aspect, in some implementations of the first aspect, the method further includes: sending second request information to the first mobility management network element, where the second request information includes the first device identification information, and the first device identification information identifies the first device. Based on the foregoing technical solution, it can be ensured that the first mobility management network element senses a user group of the first device, to ensure group handover in a unit of a user group in the first device, reduce signaling impact and signaling overheads for a core network, and ensure UE service continuity. Specifically, an N2 message may include a network registration request message, a PDU session establishment request message, or a PDU session modification request message.

With reference to the first aspect, in some implementations of the first aspect, the method further includes: the first device may be an IAB node, or may be a mobile satellite node.

According to a second aspect, a user handover method for a first device is provided. The method includes: receiving first request information, where the first request information notifies a first mobility management network element to perform path handover on at least one terminal device, the first mobility management network element serves the at least one terminal device, and the at least one terminal device accesses a network by using the first device; and performing path handover on the at least one terminal device based on the first request information. The first request information includes at least one first request message, and the at least one first request message is in one-to-one correspondence with the at least one terminal device.

It should be noted that the first device may be an IAB node, or may be a mobile satellite node. It should be understood that this is not limited in embodiments of this application.

Based on the foregoing technical solution, the first mobility management network element receives the first request information sent by an access network device, and performs, based on the first request information, group handover on the at least one terminal device of the first device in a unit of a user group, to ensure group handover in a unit of a user group in the first device, reduce signaling impact and signaling overheads for a core network, and ensure UE service continuity.

With reference to the second aspect, in some implementations of the second aspect, the method further includes: obtaining first device identification information, where the first device identification information identifies the first device. Based on the foregoing technical solution, the first mobility management network element can learn of user group information of the first device based on an identifier of the first device, to ensure group handover in a unit of a user group in the first device, reduce signaling impact and signaling overheads for a core network, and ensure UE service continuity.

With reference to the second aspect, in some implementations of the second aspect, the method further includes: determining a same session management network element for the at least one terminal device based on the first device identification information. Based on the foregoing technical solution, a same session management network element can be selected as much as possible for user groups of the first device, to ensure group handover in a unit of a user group in the first device, reduce signaling impact and signaling overheads for a core network, and ensure UE service continuity.

With reference to the second aspect, in some implementations of the second aspect, the obtaining first device identification information further includes: receiving second request information, where the second request information is used to request network registration or PDU session establishment/modification, and the second request information includes the first device identification information. Based on the foregoing technical solution, it can be ensured that a first access network device obtains user group information of the first device, to ensure group handover in a unit of a user group in the first device, reduce signaling impact and signaling overheads for a core network, and ensure UE service continuity.

With reference to the second aspect, in some implementations of the second aspect, the method further includes: the first device may be an IAB node, or may be a mobile satellite node.

With reference to the second aspect, in some implementations of the second aspect, the method further includes: storing a correspondence between the first device identification information, identification information of the at least one terminal device, identification information of the session management network element, and identification information of a PDU session. Based on the foregoing technical solution, it is ensured that group processing in a unit of a user group is implemented when a session context is subsequently established or modified, to ensure group handover in a unit of a user group in the first device, reduce signaling impact and signaling overheads for a core network, and ensure UE service continuity.

With reference to the second aspect, in some implementations of the second aspect, the method further includes: sending first session information to the session management network element based on the correspondence, where the first session information is used to create or update a context of a PDU session of the at least one terminal device. The first session information includes at least one first session message, and the first session message is in one-to-one correspondence with the at least one terminal device.

With reference to the second aspect, in some implementations of the second aspect, the first session information includes the first device identification information.

With reference to the second aspect, in some implementations of the second aspect, the first request information includes the first device identification information, and the first device identification information identifies the first device.

According to a third aspect, a user handover method for a first device is provided. The method includes: obtaining a correspondence between identification information of at least one terminal device and identification information of a first mobility management network element, where the at least one terminal device accesses a network by using the first device, and the first mobility management network element serves the at least one terminal device; and sending first request information, where the first request information notifies the first mobility management network element to perform path handover on the at least one terminal device. The first request information includes at least one first request message, and the at least one first request message is in one-to-one correspondence with the at least one terminal device.

It should be noted that the first device may be an IAB node, or may be a mobile satellite node. It should be understood that this is not limited in embodiments of this application.

Based on the foregoing technical solution, a second mobility management network element learns of a correspondence between the at least one terminal device and the first mobility management network element of the first device node, and sends the first request information to the first mobility management network element corresponding to the at least one terminal device of the first device, so that the first mobility management network element performs group handover on the at least one terminal device in a unit of a user group. This ensures group handover in a unit of a user group in the first device node, reduces signaling impact and signaling overheads for a core network, and ensures UE service continuity.

With reference to the third aspect, in some implementations of the third aspect, the obtaining a correspondence between identification information of at least one terminal and identification information of a first mobility management network element further includes: receiving the first request information, where the first request information includes the correspondence between the identification information of the at least one terminal and the identification information of the first mobility management network element. The foregoing technical solution can ensure group handover in a unit of a user group in the first device, reduce signaling impact and signaling overheads for a core network, and ensure UE service continuity.

According to a fourth aspect, a user handover method for a first device is provided. The method includes: receiving first session information, where the first session information is used to create or update a context of a packet data unit PDU session of at least one terminal device. The first session information includes at least one first session message, and the first session message is in one-to-one correspondence with the at least one terminal device.

It should be noted that the first device may be an IAB node, or may be a mobile satellite node. It should be understood that this is not limited in embodiments of this application.

Based on the foregoing technical solution, a session management network element receives the first session information sent by a first mobility management network element, so that the session management network element performs PDU session context creation or update on the at least one terminal device of the first device in a unit of a user group. This ensures group handover in a unit of a user group in the first device, reduces signaling impact and signaling overheads for a core network, and ensures UE service continuity.

With reference to the fourth aspect, in some implementations of the fourth aspect, the first session information includes first device identification information, the first device identification information identifies the first device, and the at least one terminal device accesses a network by using the first device; and the method further includes: determining a same user plane function network element for the PDU session of the at least one terminal device based on the first device identification information. Based on the foregoing technical solution, it is ensured as much as possible that a same user plane device is selected for user groups of the first device, to ensure group handover in a unit of a user group in the first device, reduce signaling impact and signaling overheads for a core network, and ensure UE service continuity.

With reference to the fourth aspect, in some implementations of the fourth aspect, the method further includes: sending second session information to the user plane function network element, where the second session information is used to update an N4 session context of the user plane function network element. The second session information includes at least one second session message, and the second session message is in one-to-one correspondence with the PDU session of the at least one terminal device. Based on the foregoing technical solution, group processing for updating or establishing an N4 session context can be ensured, to implement group handover in a unit of a user group in the first device, reduce signaling impact and signaling overheads for a core network, and ensure UE service continuity.

With reference to the fourth aspect, in some implementations of the fourth aspect, the method further includes: storing a correspondence between identification information of the at least one terminal device, the first device identification information, identification information of the PDU session, and identification information of the user plane function network element.

According to a fifth aspect, a user handover method for a first device is provided. The method includes: receiving second session information, where the second session information is used to update an N4 session context of a user plane function network element; and updating an N4 session context of a packet data unit PDU session of at least one terminal device based on the second session information, where the at least one terminal device accesses a network by using the first device. The second session information includes at least one second session message, and the second session message is in one-to-one correspondence with the PDU session of the at least one terminal device.

It should be noted that the first device may be an JAB node, or may be a mobile satellite node. It should be understood that this is not limited in embodiments of this application.

Based on the foregoing technical solution, the user plane function network element receives the second session information sent by a session management network element, so that the user plane function network element updates the N4 session context of the PDU session of the at least one terminal device of the first device in a unit of a user group. This ensures group handover in a unit of a user group in the first device, reduces signaling impact and signaling overheads for a core network, and ensures UE service continuity.

According to a sixth aspect, a network device is provided. The method includes: a processing unit, configured to determine that at least one terminal device is handed over from a first access network device to a second access network device, where the at least one terminal device accesses a network by using a first device; and a sending unit, configured to send first request information, where the first request information notifies a first mobility management network element to perform path handover on the at least one terminal device, and the first mobility management network element serves the at least one terminal device. The first request information includes at least one first request message, and the at least one first request message is in one-to-one correspondence with the at least one terminal device.

With reference to the sixth aspect, in some implementations of the sixth aspect, the processing unit is further configured to obtain first device identification information, where the first device identification information identifies the first device.

With reference to the sixth aspect, in some implementations of the sixth aspect, the processing unit is further configured to determine a same first mobility management network element for the at least one terminal device based on the first device identification information.

With reference to the sixth aspect, in some implementations of the sixth aspect, the processing unit is further configured to store a correspondence between the first device identification information, identification information of the at least one terminal device, and identification information of the first mobility management network element; and the sending unit is specifically configured to send the first request information to the first mobility management network element based on the correspondence.

With reference to the sixth aspect, in some implementations of the sixth aspect, the first request information includes a correspondence between the identification information of the at least one terminal device and the identification information of the first mobility management network element.

With reference to the sixth aspect, in some implementations of the sixth aspect, the sending unit is further configured to send the correspondence between the identification information of the at least one terminal device and the identification information of the first mobility management network element to a second mobility management network element, where the second AMF network element serves the first device.

With reference to the sixth aspect, in some implementations of the sixth aspect, the sending unit is further configured to send second request information to the first mobility management network element, where the second request information is used to request to perform network registration, the second request information includes the first device identification information, and the first device identification information identifies the first device.

With reference to the sixth aspect, in some implementations of the sixth aspect, the sending unit is further configured to send third request information to the first AMF network element, where the third request information is used to request to establish a packet data unit PDU session, the third request information includes the first device identification information, and the first device identification information identifies the first device.

According to a seventh aspect, a first mobility management network element is provided. The method includes: a receiving unit, configured to receive first request information, where the first request information notifies the first mobility management network element to perform path handover on at least one terminal device, the first mobility management network element serves the at least one terminal device, and the at least one terminal device accesses a network by using a first integrated access and backhaul device; and a processing unit, configured to perform path handover on the at least one terminal device based on the first request information. The first request information includes at least one first request message, and the at least one first request message is in one-to-one correspondence with the at least one terminal device.

With reference to the seventh aspect, in some implementations of the seventh aspect, the processing unit is further configured to obtain first device identification information, where the first device identification information identifies the first device.

With reference to the seventh aspect, in some implementations of the seventh aspect, the processing unit is further configured to determine a same session management network element for the at least one terminal device based on the first device identification information.

With reference to the seventh aspect, in some implementations of the seventh aspect, the receiving unit is further configured to receive second request information, where the second request information is used to request to register with the first mobility management network element, and the second request information includes the first device identification information.

With reference to the seventh aspect, in some implementations of the seventh aspect, the receiving unit is further configured to receive third request information, where the third request information is used to request to establish a packet data unit PDU session, and the third request information includes the first device identification information.

With reference to the seventh aspect, in some implementations of the seventh aspect, the processing unit is further configured to store a correspondence between the first device identification information, identification information of the at least one terminal device, identification information of the session management network element, and identification information of the PDU session.

With reference to the seventh aspect, in some implementations of the seventh aspect, the first mobility management network element further includes: a sending unit, configured to send first session information to the session management network element based on the correspondence, where the first session information is used to create or update a context of a PDU session of the at least one terminal device. The first session information includes at least one first session message, and the first session message is in one-to-one correspondence with the at least one terminal device.

With reference to the seventh aspect, in some implementations of the seventh aspect, the first session information includes the first device identification information.

With reference to the seventh aspect, in some implementations of the seventh aspect, the first request information includes the first device identification information, and the first device identification information identifies the first device.

According to an eighth aspect, a second mobility management network element is provided. The method includes: a processing unit, configured to obtain a correspondence between identification information of at least one terminal device and identification information of a first access and mobility management function network element, where the at least one terminal device accesses a network by using a first integrated access and backhaul device, and the first mobility management network element serves the at least one terminal device; and a sending unit, configured to send first request information, where the first request information notifies the first mobility management network element to perform path handover on the at least one terminal device. The first request information includes at least one first request message, and the at least one first request message is in one-to-one correspondence with the at least one terminal device.

With reference to the eighth aspect, in some implementations of the eighth aspect, the second mobility management network element further includes: a receiving unit, configured to receive the first request information, where the first request information includes the correspondence between the identification information of the at least one terminal and the identification information of the first mobility management network element.

With reference to the eighth aspect, in some implementations of the eighth aspect, the receiving unit is configured to receive the correspondence that is between the identification information of the at least one terminal and the identification information of the first mobility management network element and that is sent by an access network device.

According to a ninth aspect, a session management network element is provided. The method includes: a receiving unit, configured to receive first session information, where the first session information is used to create or update a context of a packet data unit PDU session of at least one terminal device. The first session information includes at least one first session message, and the first session message is in one-to-one correspondence with the at least one terminal device.

With reference to the ninth aspect, in some implementations of the ninth aspect, the first session information includes identification information of a first integrated access and backhaul device, the first device identification information identifies the first device, and the at least one terminal device accesses a network by using the first device. The session management network element further includes: a processing unit, configured to determine a same user plane function network element for the PDU session of the at least one terminal device based on the first device identification information.

With reference to the ninth aspect, in some implementations of the ninth aspect, the session management network element further includes: a sending unit, configured to send second session information to the user plane function network element, where the second session information is used to update an N4 session context of the user plane function network element. The second session information includes at least one second session message, and the second session message is in one-to-one correspondence with the PDU session of the at least one terminal device.

With reference to the ninth aspect, in some implementations of the ninth aspect, the processing unit is further configured to store a correspondence between identification information of the at least one terminal device, the first device identification information, identification information of the PDU session, and identification information of the user plane function network element.

According to a tenth aspect, a user plane function network element is provided. The method includes: a receiving unit, configured to receive second session information, where the second session information is used to update an N4 session context of the user plane function network element; and a processing unit, configured to update an N4 session context of a packet data unit PDU session of at least one terminal device based on the second session information, where the at least one terminal device accesses a network by using a first integrated access and backhaul device. The second session information includes at least one second session message, and the second session message is in one-to-one correspondence with the PDU session of the at least one terminal device.

According to an eleventh aspect, a network device is provided, including at least one processor, a memory, and a transceiver. The memory is configured to store instructions, the transceiver is used by the network device to communicate with another device, and the stored instructions are directly or indirectly executed by the at least one processor, so that the network device can perform the method according to any one of the first aspect or the optional implementations of the first aspect.

According to a twelfth aspect, a first mobility management network element is provided, including at least one processor, a memory, and a transceiver. The memory is configured to store instructions, the transceiver is used by the first mobility management network element to communicate with another device, and the stored instructions are directly or indirectly executed by the at least one processor, so that the first mobility management network element can perform the method according to any one of the second aspect or the optional implementations of the second aspect.

According to a thirteenth aspect, a second mobility management network element is provided, including at least one processor, a memory, and a transceiver. The memory is configured to store instructions, the transceiver is used by the second mobility management network element to communicate with another device, and the stored instructions are directly or indirectly executed by the at least one processor, so that the second mobility management network element can perform the method according to any one of the third aspect or the optional implementations of the third aspect.

According to a fourteenth aspect, a session management network element is provided, including at least one processor, a memory, and a transceiver. The memory is configured to store instructions, the transceiver is used by the session management network element to communicate with another device, and the stored instructions are directly or indirectly executed by the at least one processor, so that the session management network element can perform the method according to any one of the fourth aspect or the optional implementations of the fourth aspect.

According to a fifteenth aspect, a user plane function network element is provided, including at least one processor, a memory, and a transceiver. The memory is configured to store instructions, the transceiver is used by the user plane function network element to communicate with another device, and the stored instructions are directly or indirectly executed by the at least one processor, so that the user plane function network element can perform the method according to any one of the fifth aspect or the optional implementations of the fifth aspect.

According to a sixteenth aspect, a chip system is provided, including at least one processor. The at least one processor is configured to execute stored instructions, so that a network device can perform the method according to any one of the first aspect or the optional implementations of the first aspect.

According to a seventeenth aspect, a chip system is provided, including at least one processor. The at least one processor is configured to execute stored instructions, so that a first mobility management network element can perform the method according to any one of the second aspect or the optional implementations of the second aspect.

According to an eighteenth aspect, a chip system is provided, including at least one processor. The at least one processor is configured to execute stored instructions, so that a second mobility management network element can perform the method according to any one of the third aspect or the optional implementations of the third aspect.

According to a nineteenth aspect, a chip system is provided, including at least one processor. The at least one processor is configured to execute stored instructions, so that a session management network element can perform the method according to any one of the fourth aspect or the optional implementations of the fourth aspect.

According to a twentieth aspect, a chip system is provided, including at least one processor. The at least one processor is configured to execute stored instructions, so that a user plane function network element can perform the method according to any one of the fifth aspect or the optional implementations of the fifth aspect.

According to a twenty-first aspect, a computer storage medium is provided. The computer storage medium stores program instructions, and when the instructions are executed, a network device is enabled to perform the method according to any one of the first aspect or the optional implementations of the first aspect.

According to a twenty-second aspect, a computer storage medium is provided. The computer storage medium stores program instructions, and when the instructions are executed, a first mobility management network element is enabled to perform the method according to any one of the second aspect or the optional implementations of the second aspect.

According to a twenty-third aspect, a computer storage medium is provided. The computer storage medium stores program instructions, and when the instructions are executed, a second mobility management network element is enabled to perform the method according to any one of the third aspect or the optional implementations of the third aspect.

According to a twenty-fourth aspect, a computer storage medium is provided. The computer storage medium stores program instructions, and when the instructions are executed, a session management network element is enabled to perform the method according to any one of the fourth aspect or the optional implementations of the fourth aspect.

According to a twenty-fifth aspect, a computer storage medium is provided. The computer storage medium stores program instructions, and when the instructions are executed, a user plane function network element is enabled to perform the method according to any one of the fifth aspect or the optional implementations of the fifth aspect.

According to a twenty-sixth aspect, a computer program product is provided. The computer program product includes instructions, and when the instructions are executed, a network device is enabled to perform the method according to any one of the first aspect or the optional implementations of the first aspect.

According to a twenty-seventh aspect, a computer program product is provided. The computer program product includes instructions, and when the instructions are executed, a first mobility management network element is enabled to perform the method according to any one of the second aspect or the optional implementations of the second aspect.

According to a twenty-eighth aspect, a computer program product is provided. The computer program product includes instructions, and when the instructions are executed, a second mobility management network element is enabled to perform the method according to any one of the third aspect or the optional implementations of the third aspect.

According to a twenty-ninth aspect, a computer program product is provided. The computer program product includes instructions, and when the instructions are executed, a session management network element is enabled to perform the method according to any one of the fourth aspect or the optional implementations of the fourth aspect.

According to a thirtieth aspect, a computer program product is provided. The computer program product includes instructions, and when the instructions are executed, a user plane function network element is enabled to perform the method according to any one of the fifth aspect or the optional implementations of the fifth aspect.

According to a thirty-first aspect, a system is provided. The system includes the network device according to any one of the first aspect or the optional implementations of the first aspect, and/or the first mobility management network element according to any one of the second aspect or the optional implementations of the second aspect, and/or the second mobility management network element according to any one of the third aspect or the optional implementations of the third aspect; and/or the session management network element according to any one of the fourth aspect or the optional implementations of the fourth aspect; and/or the user plane function network element according to any one of the fifth aspect or the optional implementations of the fifth aspect.

DETAILED DESCRIPTION OF ILLUSTRATIVE EMBODIMENTS

The following describes technical solutions of embodiments in this application with reference to accompanying drawings.

The technical solutions in embodiments of this application may be applied to various communication systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5th generation (5G) system, or a new radio (NR) system.

In embodiments of this application, a terminal device may be user equipment, an access terminal, a subscriber unit, a subscriber station, a mobile station, a mobile console, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in embodiments of this application.

In embodiments of this application, an access network device may be a device configured to communicate with a terminal device. The access network device may be a base transceiver station (BTS) in a global system for mobile communications (GSM) or a code division multiple access (CDMA) system, or may be a NodeB (NB) in a wideband code division multiple access (WCDMA) system, or may be an evolved NodeB (eNB or eNodeB) in an LTE system, or may be a radio controller in a cloud radio access network (CRAN) scenario. Alternatively, the network device may be a relay station, an access point, a vehicle-mounted device, a wearable device, a network device in a future 5G network, a network device in a future evolved PLMN network, or the like. This is not limited in embodiments of this application.

It should be noted that, in embodiments of this application, the access network device and the terminal device may be at fixed locations, or are movable. For example, the access network device and the terminal device may be deployed on land, including indoor, outdoor, handheld, or vehicle-mounted, or may be deployed on water, or may be deployed on an airplane, a balloon, or an artificial satellite in the air. It should be understood that this is not limited in embodiments of this application.

Figure 1:
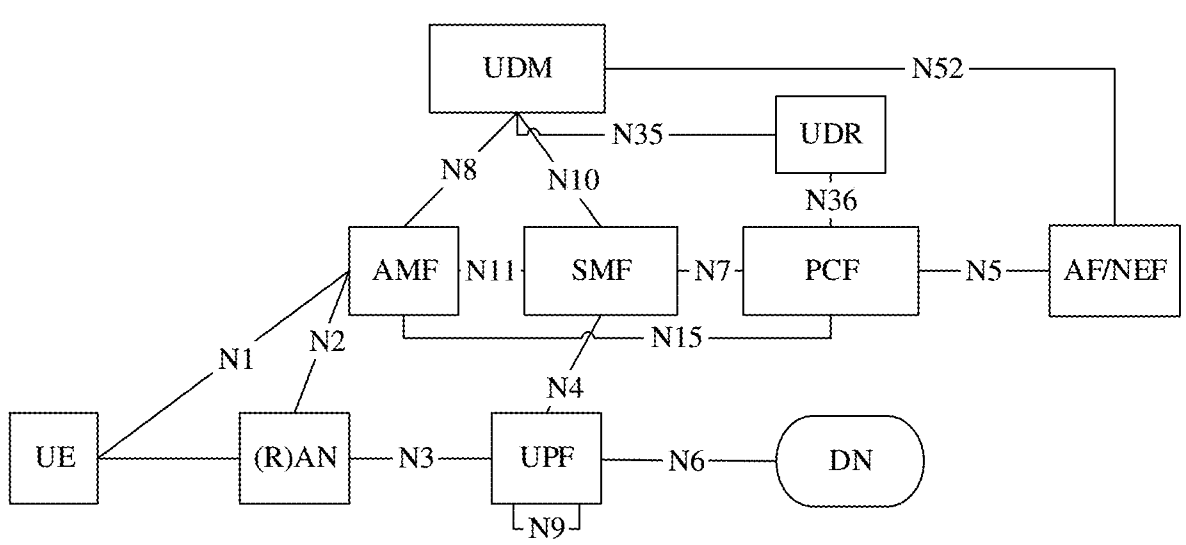
FIG. 1 is a diagram of an architecture of a basic 5G system 200.

FIG. 1 is a diagram of an architecture of a basic 5G system 100. As shown in FIG. 1, the system 100 includes a policy control function (PCF) network element, an access and mobility management function (AMF) network element, a session management function (SMF), a radio access network (RAN), unified data management (UDM), a data network (DN), a user plane function (UPF), UE, an application function (AF), and/or unified data repository (UDR). Optionally, FIG. 1 may further include the following functions (not shown in FIG. 1): a network slice selection function (NSSF), an authentication server function (AUSF), a network exposure function (NEF), a network repository function (NRF), a binding support function (BSF) network element, and a network data analysis function (NWDAF) network element.

Main functions of the network elements are described as follows:

1. Terminal Device

In embodiments of this application, the terminal device may be user equipment (UE), a mobile station (MS), a mobile terminal (MT), an access terminal, a subscriber unit, a subscriber station, a mobile station, a mobile console, a remote station, a remote terminal, a mobile device, a user terminal, a terminal, a wireless communication device, a user agent, a user apparatus, or the like.

The terminal device may be a device that provides voice/data connectivity for a user, for example, a handheld device having a wireless connection function or a vehicle-mounted device. Currently, some examples of the terminal may be: a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving (self driving or autopilot), a wireless terminal in remote medical surgery, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like. This is not limited in embodiments of this application.

By way of example, and not limitation, in embodiments of this application, the terminal device may alternatively be a wearable device. The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on the body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application function and need to work with other devices such as smartphones, for example, various smart bands or smart jewelry for monitoring physical signs. In addition, in embodiments of this application, the terminal device may alternatively be a terminal device in an internet of things (IoT) system.

2. Radio Access Network

The radio access network is an access network that implements an access network function based on a wireless communication technology. The radio access network can manage a radio resource, and provide a wireless access service or an air interface access service for a terminal, to forward a control signal and user data between the terminal and a core network.

By way of example, and not limitation, the radio access network may be an evolved NodeB (evolved NodeB, eNB or eNodeB) in an LTE system; or may be a radio controller in a cloud radio access network (CRAN) scenario. Alternatively, the access device may be a relay station, an access point, a vehicle-mounted device, a wearable device, an access device in a 5G network, an access device in a future evolved PLMN network, or the like; or may be an access point (AP) in a WLAN; or may be a gNB in an NR system. This is not limited in embodiments of this application.

3. Access and Mobility Management Function Network Element

The access and mobility management function network element is mainly used for mobility management, access management, and the like, may be configured to implement another function in a mobility management entity (MME) function other than session management, for example, lawful interception, access authorization (or authentication), of another function, and is further configured to transfer a user policy between the UE and the PCF. In embodiments of this application, the access and mobility management function network element may be configured to implement a function of an access and mobility management network element.

4. Session Management Function Network Element

The session management function network element is mainly used for session management, allocation and management of an internet protocol (IP) address of the terminal device, selection of a manageable user plane function (UPF) network element, policy control and termination of a charging functional interface, downlink data notification, and the like. In embodiments of this application, the session management function network element may be configured to implement a function of a session management network element.

5. User Plane Function Network Element

The user plane function network element may be used for packet routing and forwarding, QoS parameter processing of user plane data, or the like. User data may be accessed to a data network (DN) through this network element. In embodiments of this application, the user plane function network element may be configured to implement a function of a user plane network element. For example, when a session is established on different UPFs, service experience of the UE is also different. Therefore, the SMF needs to select an appropriate UPF for a session of the UE.

6. Policy Control Network Element

The policy control network element is configured to guide a unified policy framework of network behavior, and provide policy rule information and the like for a control plane function network element (for example, the AMF network element or the SMF network element). The policy control network element is mainly responsible for policy control functions such as session and service flow level charging, QoS bandwidth guarantee, mobility management, and UE policy decision making. In embodiments of this application, PCFs connected to the AMF and the SMF are respectively corresponding to an AM PCF (PCF for Access and Mobility Control) and an SM PCF (PCF for Session Management). In an actual deployment scenario, the PCFs may be a same PCF entity, or may be two different PCF entities.

7. Network Exposure Function Network Element

The network exposure function network element is configured to expose, to the outside, service and network capability information (such as a terminal location and whether a session is reachable) provided by a 3GPP network function.

8. Application Function Network Element

The application function network element is mainly configured to transfer a requirement of an application side for a network side, for example, a QoS requirement or a user status event subscription. The AF may be a third-party function entity or an application service deployed by an operator, for example, an IMS voice call service. When interacting with a core network, an application function entity of a third-party application may further perform authorization processing by using the NEF. For example, the third-party application function directly sends a request message to the NEF; and the NEF determines whether the AF is allowed to send the request message, and forwards the request message to a corresponding PCF or unified data management (UDM) if the authentication succeeds.

9. Unified Data Management Network Element

The unified data management network element is mainly used for unified data management, and supports authentication trust status processing, user identity processing, access authorization, registration and mobility management, subscription management, short message management, and the like in a 3GPP authentication and key agreement mechanism.

10. Unified Data Repository Network Element

The unified data repository network element is mainly configured to access data of a type such as subscription data, policy data, and application data.

11. Data Network

The data network is a specific data service network accessed by the UE. For example, a typical DN includes the internet, an IP multimedia subsystem (IPMS), or the like.

12. Network Data Analysis Function Network Element

The network data analysis function network element is mainly configured to collect data (including one or more types of terminal device data, access network device data, core network element data, and third-party application data), provides a data analysis service based on a machine learning model, and may output a data analysis result for a network, a network management system, and an application for policy decision making. The NWDAF network element may be an independent network element, or may be co-located with another network element. For example, the NWDAF network element is disposed in the PCF network element or the AMF network element.

13. Network Repository Function Network Element

The network repository function network element can be configured to provide a network element discovery function, and provide, based on a request of another network element, network element information corresponding to a network element type. The NRF network element further provides network element management services, for example, network element registration, update, and deregistration, and network element status subscription and push.

14. Binding Support Function Network Element

The binding support function network element may provide BSF service registration/deregistration/update, detection on connection to the NRF network element, session binding information creation, terminal device information obtaining, session binding information query for duplicate IP addresses, and other functions.

15. Authentication Server Function Network Element

The authentication server function network element performs user authentication to determine whether to allow a user or a device to access a network.

In the foregoing architecture, functions of all interfaces are described as follows:

N7 is an interface between the PCF and the SMF, and is configured to deliver a PDU session granularity and a service data flow granularity control policy.

N15 is an interface between the PCF and the AMF, and is configured to deliver a UE policy and an access control-related policy.

N5 is an interface between the AF and the PCF, and is configured to deliver an application service request and report a network event.

N4 is an interface between the SMF and the UPF, and is configured to transfer information between a control plane and a user plane, including delivery of a forwarding rule, a QoS control rule, a traffic statistics rule, and the like from the control plane to the user plane, and reporting of user plane information.

N11 is an interface between the SMF and the AMF, and is configured to: transfer information about a PDU session tunnel between the RAN and the UPF, transfer a control message to be sent to the UE, transfer radio resource control information to be sent to the RAN, and the like.

N2 is an interface between the AMF and the RAN, and is configured to transfer radio bearer control information from a core network side to the RAN, and the like.

N1 is an interface between the AMF and the UE, is access-irrelevant, and is configured to transmit the QoS control rule to the UE, and the like.

N8 is an interface between the AMF and the UDM, and is used by the AMF to obtain subscription data and authentication data related to access and mobility management from the UDM and is used by the AMF to register current mobility management-related information of the UE with the UDM.

N10 is an interface between the SMF and the UDM, and is used by the SMF to obtain subscription data related to session management from the UDM and is used by the SMF to register current session-related information of the UE with the UDM.

N35 is an interface between the UDM and the UDR, and is used by the UDM to obtain user subscription data information from the UDR.

N36 is an interface between the PCF and the UDR, and is used by the PCF to obtain policy-related subscription data and application data-related information from the UDR.

N52 is an interface between the UDM and the NEF, and is used by the NEF to expose a network capability to a third-party application function. For example, the third-party application function subscribes to reachability events of all users in a specific group from the UDM through the NEF.

In addition, the NEF further has direct interfaces with the AMF and the SMF: N29 and N51 interfaces (not shown in the foregoing figure for ease of simplification of the figure) that are configured to open carrier network capabilities to third-party application function entities. The N29 interface can be used by the NEF to subscribe to a corresponding network event from the AMF and update user configuration information. The N51 interface can be configured to update application configuration data on the SMF/UPF, such as packet flow description (PFD) information corresponding to an application ID.

It should be understood that the foregoing network architecture applied to embodiments of this application is merely an example of a network architecture described from the perspective of a conventional point-to-point architecture and a service-oriented architecture, and a network architecture applicable to embodiments of this application is not limited thereto. Any network architecture that can implement the functions of the foregoing network elements is applicable to embodiments of this application.

It should be understood that names of the interfaces between the network elements in FIG. 1 are merely examples, and the interfaces may have other names during specific implementation. This is not specifically limited in this application. In addition, names of messages (or signaling) transmitted between the foregoing network elements are merely examples, and do not constitute any limitation on functions of the messages.

It should be noted that the foregoing network elements may also be referred to as entities, devices, apparatuses, modules, or the like. This is not particularly limited in this application. In addition, in this application, for ease of understanding and description, a description of a network element is omitted in some descriptions. For example, the SMF network element is referred to as an SMF for short. In this case, "SMF" should be understood as the SMF network element. The following omits descriptions of a same or similar case.

It may be understood that the foregoing network elements or functions may be network elements in a hardware device, or may be software functions that are run on dedicated hardware, or may be instantiated virtualization functions on a platform (for example, a cloud platform). Optionally, the foregoing network elements or functions may be implemented by one device, or may be jointly implemented by a plurality of devices, or may be implemented by one function module in one device. This is not specifically limited in embodiments of this application.

It should be further understood that, in the communication system shown in FIG. 1, the functions of the constituent network elements are merely examples. When the constituent network elements are applied to embodiments of this application, not all the functions are necessary.

In addition, names of the network elements (such as the PCF and the AMF) included in FIG. 1 are merely names, and the names do not constitute a limitation on the functions of the network elements. In a 5G network and another future network, the foregoing network elements may alternatively have other names. This is not specifically limited in embodiments of this application. For example, in a 6G network, some or all of the foregoing network elements may still use terms in 5G, or may have other names. A general description is provided herein. Details are not described again below.

It should be further noted that communication between the network elements having the control plane functions in FIG. 1 is described by using a non-service-oriented interface as an example, but does not constitute a limitation on the protection scope of embodiments of this application. A person skilled in the art may understand that the network elements having the control plane functions in FIG. 1 may alternatively communicate with each other through a service-oriented interface. For example, an external service-oriented interface provided by the AMF may be Namf; a service-oriented interface provided by the SMF may be Nsmf; an external service-oriented interface provided by the UDM may be Nudm; a service-oriented interface provided by the AF may be Naf; and an external service-oriented interface provided by the PCF may be Npcf.

The network element in FIG. 1 is an architecture based on a reference point, and does not constitute a limitation on embodiments of this application.

Figure 2:
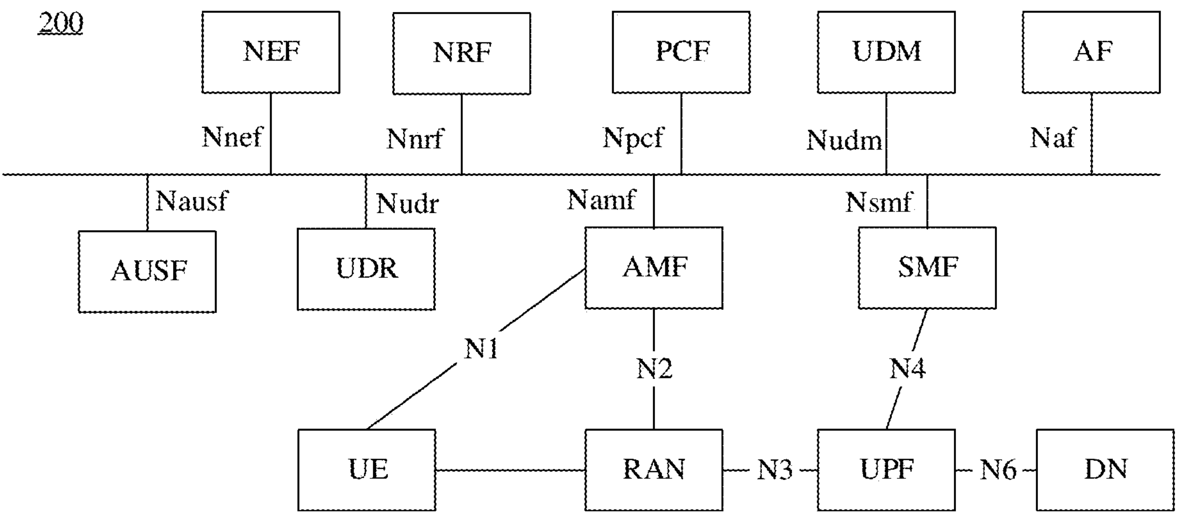
FIG. 2 is a diagram of an architecture based on a service-oriented interface.

FIG. 2 is a diagram of an architecture based on a service-oriented interface. As shown in FIG. 2, the architecture includes an NSSF, an AUSF, a UDM, an NEF, an NRF, a PCF, an AF, an AMF, an SMF, UE, a RAN, a UPF, and a DN. In FIG. 2, an external service-oriented interface provided by the NSSF may be Nnssf, an external service-oriented interface provided by the NEF may be Nnef, an external service-oriented interface provided by the NRF may be Nnrf, an external service-oriented interface provided by the AMF may be Namf, a service-oriented interface provided by the SMF may be Nsmf, an external service-oriented interface provided by the UDM may be Nudm, a service-oriented interface provided by the AF may be Naf, an external service-oriented interface provided by the PCF may be Npcf, an external service-oriented interface provided by the AUSF may be Nausf, an external service-oriented interface provided by a CHF may be Nchf, and an interface between a control plane function and each of the RAN and the UPF is a non-service-oriented interface. The UE is connected to the AMF through an N1 interface, and the UE is connected to the RAN through a radio resource control (RRC) protocol. The RAN is connected to the AMF through an N2 interface, and the RAN is connected to the UPF through an N3 interface. The UPF is connected to the DN through an N6 interface, and the UPF is connected to the SMF through an N4 interface. For related descriptions, refer to a 5G system architecture in a standard. For brevity, a connection relationship of the architecture 200 is not described herein.

It may be understood that the foregoing network elements or functions may be network elements in a hardware device, or may be software functions that are run on dedicated hardware, or may be instantiated virtualization functions on a platform (for example, a cloud platform). Optionally, the foregoing network elements or functions may be implemented by one device, or may be jointly implemented by a plurality of devices, or may be implemented by one function module in one device. This is not specifically limited in embodiments of this application.

In this embodiment of this application, the mobility management network element may be a mobility management entity (MME) in a 4th generation (4G) network, an AMF network element in a 5G network, or another network element that has a function of an MME or an AMF network element in a future communication system.

In this embodiment of this application, the session management network element may be a mobility management entity (MME) and/or a serving gateway (S-GW) in the 4th generation (4G) network, an SMF network element in the 5G network, or another network element that has a function of an MME (+S-GW) or an SMF network element in the future communication system.

In this embodiment of this application, the access network device may be an access network device (for example, an eNB) in the 4G network, an access network device (for example, a gNB) in the 5G network, or another network element that has a function of an access network device in the 4G network or an access network device in the 5G network in the future communication system.

In this embodiment of this application, the policy control network element may be a policy and charging rules function (PCRF) network element in the 4G network, a PCF network element in the 5G network, or another network element that has a function of a PCRF network element or a PCF network element in the future communication system.

In this embodiment of this application, the repository network element may be a home subscriber server (HSS) in the 4G network, a UDR network element in the 5G network, or another network element that has a function of an HSS or a UDR network element in the future communication system.

For ease of understanding of embodiments of this application, a process in which the UE establishes a PDU session connection and manages a PDU session is first briefly described by using the 5G network as an example.

The 5G network provides a data exchange service for the UE and the DN network. The service is referred to as a PDU connection service. The UE obtains a PDU connection service by initiating a PDU session establishment request to a mobile network. A network side provides the PDU connection service by maintaining a PDU session for the UE.

To exchange data between the UE and the DN network, the UE needs to use the PDU connection service provided by the mobile network, to establish a DNN-based PDU session (signaling plane procedure). PDU session establishment includes two basic processes: The UE performs network access registration with the mobile network and the UE requests a network to establish a PDU session. The two processes are signaling plane interaction between the UE and the mobile network.

A general procedure in which the UE performs network access registration may be briefly described as follows: The UE sends a registration request to the AMF by using the (R)AN, and the AMF obtains subscription data from a specific UDM based on a user identifier. After a series of authentication and authorization operations, the network side finally determines that network access is allowed for the UE. In this case, the AMF responds to the registration request of the UE and delivers related policy information to the UE, and the UE completes network registration and camping. The AMF on the network side maintains network access registration information of the UE and performs mobility management on the UE.

After completing network access registration, the UE may initiate a PDU session establishment request to obtain a PDU connection service of the network. A general PDU session establishment procedure may be briefly described as follows: The UE sends a PDU session establishment request to the AMF by using the RAN. The AMF selects an SMF to provide a session service for the UE, stores a correspondence between the SMF and the PDU session, and sends the session establishment request to the SMF. The SMF selects a corresponding UPF for the UE to establish a user plane transmission path, and allocates an IP address to the UE.

In a process of performing PDU session management for the UE, the SMF interacts with the UPF through the N4 interface to control the UPF to create, modify, and delete a corresponding UE N4 session (N4 Session/PFCP Session), thereby controlling data packet processing of the UPF. The SMF delivers various data packet processing rules for UE N4 sessions in the UPF to control data packet processing of the UPF. After receiving an external data packet, the UPF matches the packet based on a data packet matching rule delivered by the SMF and forwards the packet based on a forwarding rule.

In an NR technology, an access network device (for example, a gNB) may include one gNB central unit (CU) and one or more gNB distributed units (DU). The gNB-CU and the gNB-DU are different logical nodes, and may be deployed on different physical devices or deployed on a same physical device.

Figure 3:
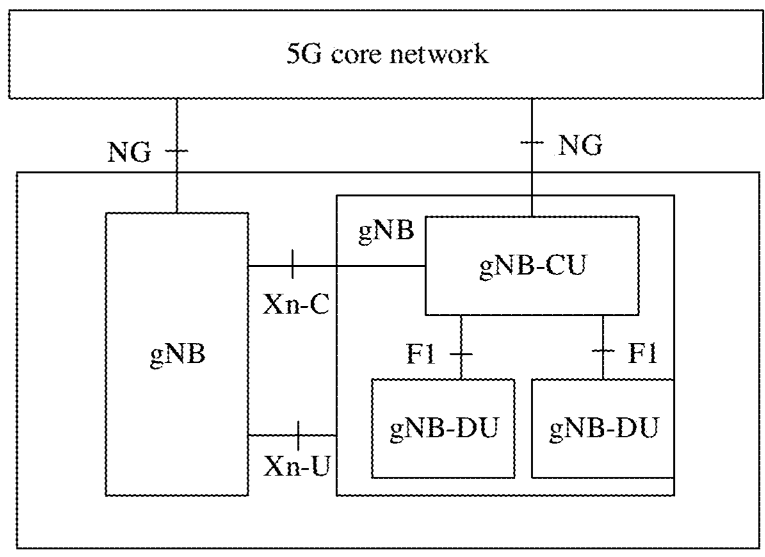
FIG. 3 is a diagram of a CU-DU split structure used by a gNB.

A CU-DU split structure used by the gNB is shown in FIG. 3. The gNB-CU is connected to the gNB-DU through an F1 interface, the gNB-CU is connected to a 5G core network through an NG interface, and gNBs are connected to each other through an Xn interface. The Xn interface includes an Xn-C interface and an Xn-U interface. The Xn-C interface is configured to transmit control plane signaling between the two gNBs, and the Xn-U interface is configured to transmit user plane data between the two gNBs. An interface between the gNB and UE is referred to as a Uu interface (namely, an interface between the UE and the gNB-DU). The terminal device accesses the gNB-CU through the gNB-DU. A peer physical (PHY) layer/media access control (MAC) layer/radio link control (RLC) layer of the terminal device is located on the gNB-DU, and a peer packet data convergence protocol (PDCP) layer/radio resource control (RRC) layer/service data adaptation protocol (SDAP) layer of the terminal device is located on the gNB-CU.

It should be understood that the foregoing deployment of the protocol layers on the gNB-DU and the gNB-CU is merely one possibility, and the protocol layers may be deployed in another manner. For example, the peer PHY layer/MAC layer of the terminal device is located on the gNB-DU, the peer PDCP layer/RRC layer/SDAP layer of the terminal device is located on the gNB-CU, and the peer RLC layer of the terminal device is also located on the gNB-CU. All these fall within the protection scope of this application, and are not limited herein in this application.

For a control plane, in an uplink (UL) direction, the gNB-DU encapsulates an RRC message generated by the terminal device into an F1 application protocol (F1AP) message of the F1 interface, and sends the F1AP message to the gNB-CU. In a downlink (DL) direction, the gNB-CU encapsulates the RRC message into the F1AP message and sends the F1AP message to the gNB-DU. The gNB-DU extracts the RRC message from the F1AP message, maps the RRC message to a signaling radio bearer (SRB) corresponding to the Uu interface, and sends the signaling radio bearer to the terminal device.

For a user plane, in a UL direction, the gNB-DU maps a data packet of the terminal device that is received on a data radio bearer (DRB) of the Uu interface to a corresponding general packet radio service tunneling protocol (GTP) tunnel and sends the GTP tunnel to the gNB-CU. In a DL direction, the gNB-CU maps the data packet of the terminal device to a corresponding GTP tunnel for sending to the gNB-DU. The gNB-DU extracts the data packet of the terminal device in the GTP tunnel, maps the data packet to the DRB corresponding to the Uu interface, and sends the DRB to the terminal device.

A 5G communication system imposes stricter requirements on various network performance indicators in an all-round manner. For example, a capacity indicator is increased by 1000 times, wider coverage is required, and ultra-high reliability and an ultra-low latency are required. Therefore, an integrated access and backhaul (JAB) technology is introduced.

In an IAB network, a relay node (RN), which may be referred to as an IAB node, may provide a wireless access service and a wireless backhaul service for user equipment. Specifically, service data of the user equipment is transmitted by the IAB node to an IAB donor node through a wireless backhaul link. The IAB donor node may also be referred to as a donor IAB node or an IAB donor base station. In an NR system, the IAB donor base station may be a donor next-generation NodeB (donor gNodeB, DgNB) or a next-generation NodeB. In an LTE system (or referred to as a 4G system), the IAB donor base station may be a donor evolved NodeB (donor eNodeB, DeNB). Certainly, the IAB donor node may alternatively be referred to as a gNB, an eNB, or an IAB donor for short.

The IAB donor may alternatively use a CU-DU split architecture. To be specific, the IAB donor includes an IAB donor CU (or may be referred to as a donor CU) and an IAB donor DU (or may be referred to as a donor DU). An interface between the IAB donor CU and the IAB donor DU is an F1 interface. The JAB node may include a mobile terminal (MT) unit and a distributed unit (DU). The IAB-MT may also be referred to as IAB-UE, has a function of the terminal device, and mainly completes an operation similar to that of the terminal device. The IAB-DU has some functions of a base station, and mainly completes an operation similar to that of the base station.

For the IAB donor, the donor DU has a function similar to that of the gNB-DU in NR, and the donor CU has a function similar to that of the gNB-CU in NR.

For the IAB node, the IAB-DU has a function similar to that of the gNB-DU in NR, and provides an access service for a child node of the IAB-DU. The child node of the IAB-DU may be a terminal device, or may be another IAB node. The JAB-MT is similar to the terminal device, and is configured to provide data backhaul. An IAB node accessed by the terminal device may be referred to as an access IAB node, and an IAB node on a path between the access IAB node and the IAB donor is referred to as an intermediate IAB node.

Figure 4:
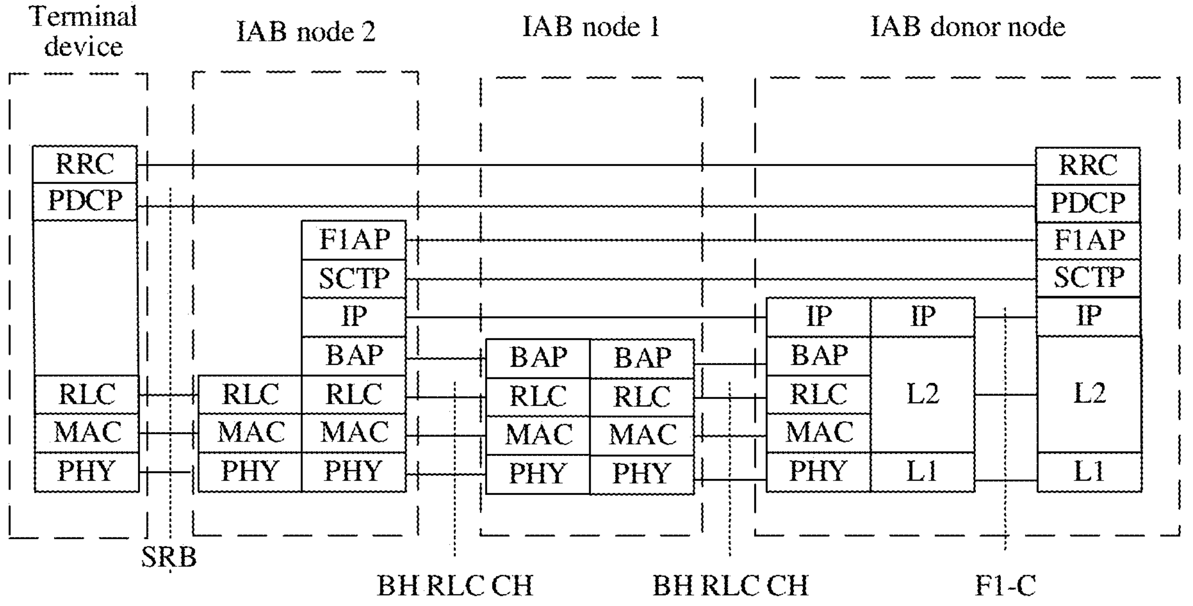
FIG. 4 is a diagram of a control plane protocol stack during two-hop data backhaul.

FIG. 4 is a diagram of a control plane protocol stack during two-hop data backhaul. As shown in FIG. 4, an access IAB node (namely, an JAB node2 DU) encapsulates an RRC message generated by a terminal device into an F1AP message, and sends the F1AP message to a donor CU. If the donor CU uses a CP-UP split architecture, the IAB node2 DU encapsulates the RRC message generated by the terminal device into the F1AP message, and sends the F1AP message to the donor CU-CP. An interface between the IAB node2 DU and the donor CU-CP is also referred to as an F1-C interface.

Figure 5:
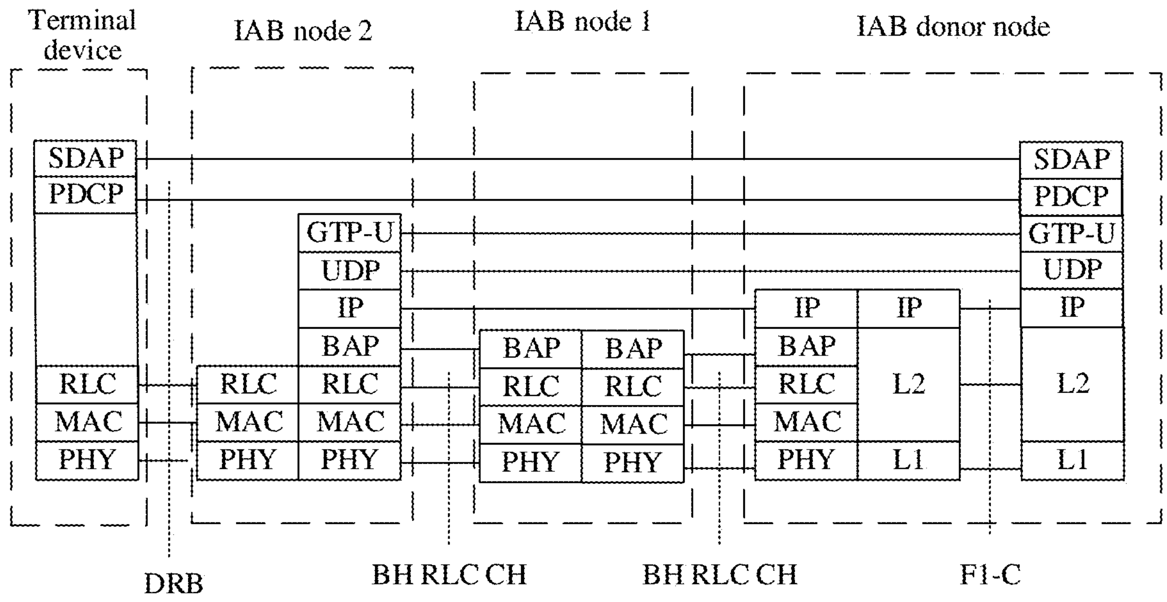
FIG. 5 is a diagram of a user plane protocol stack during two-hop data backhaul.

FIG. 5 is a diagram of a user plane protocol stack during two-hop data backhaul. As shown in FIG. 5, a corresponding GTP tunnel (a GTP tunnel per UE bearer) is established between an access IAB node (namely, an IAB node2 DU) and a donor CU for a service bearer of each terminal device. If the donor CU uses a CP-UP split architecture, the IAB node2 DU sends a service of the terminal device to the donor CU-UP through the corresponding GTP tunnel. An interface between the IAB node2 DU and the donor CU-UP is also referred to as an F1-U interface.

Currently, the IAB node is deployed at a fixed location without considering mobility of the IAB node. With the network development, a mobile scenario is one of important 5G scenarios. Because the IAB node can provide wireless backhaul, it is suitable to improve network coverage and capacity in the mobile scenario. In the scenario, because the IAB node is deployed on a mobile device (for example, a high-speed railway, a car, or a subway) and moves with the mobile device, the IAB node may be referred to as a mobile IAB node.

Currently, in a process in which the IAB node moves, the terminal device also moves with the IAB node. When the IAB node is handed over between IAB donor nodes, terminal devices of the IAB node are collectively handed over, causing a severe signaling storm (when the IAB node is handed over, the terminal devices of the IAB node need to be handed over together with the IAB node, and the signaling storm is caused by independent handover procedures respectively triggered by the terminal devices of the IAB node). To avoid a severe signaling storm caused by collective handover of the terminal devices of the IAB node in a process in which the terminal devices move with the IAB node, it may be considered that the terminal devices of the IAB node are used as one user group. In other words, in the user group, the IAB node may be used as a head node, and the terminal devices of the IAB node are handed over together with the head node. For example, when an IAB donor node is handed over during handover of the IAB node, the terminal device of the IAB node is handed over together with the IAB node. However, in a handover process, a topology relationship between the IAB node and the terminal device of the IAB node remains unchanged.

It should be understood that the terminal devices of the IAB node are used as one user group. The user group may be a virtual concept. It may be understood that, in embodiments of this application, the terminal devices of the IAB node are not used as a real user group, but at least one terminal device of the IAB node is handed over with the IAB node in a unit of a group when the IAB node moves and is handed over.

In view of this, this application provides a handover method for a first device. A same core network node is configured for terminal devices of the first device, to implement group handover in a unit of a user group in a handover process, thereby reducing signaling impact and signaling overheads for a core network, and ensuring terminal device service continuity.

It should be noted that the first device may be an IAB node, or may be a satellite base station. When the first device is an IAB node, this application provides an IAB node handover method. A same core network node is configured for terminal devices of the IAB node, to implement group handover in a unit of a user group in a handover process. When the first device is a satellite base station, this application provides a user handover method in a satellite base station, to implement group handover in a unit of a user group in a terminal device of the satellite base station.

For ease of understanding of embodiments of this application, a communication system to which an embodiment of this application is applicable is first briefly described with reference to FIG. 6.

Figure 6:
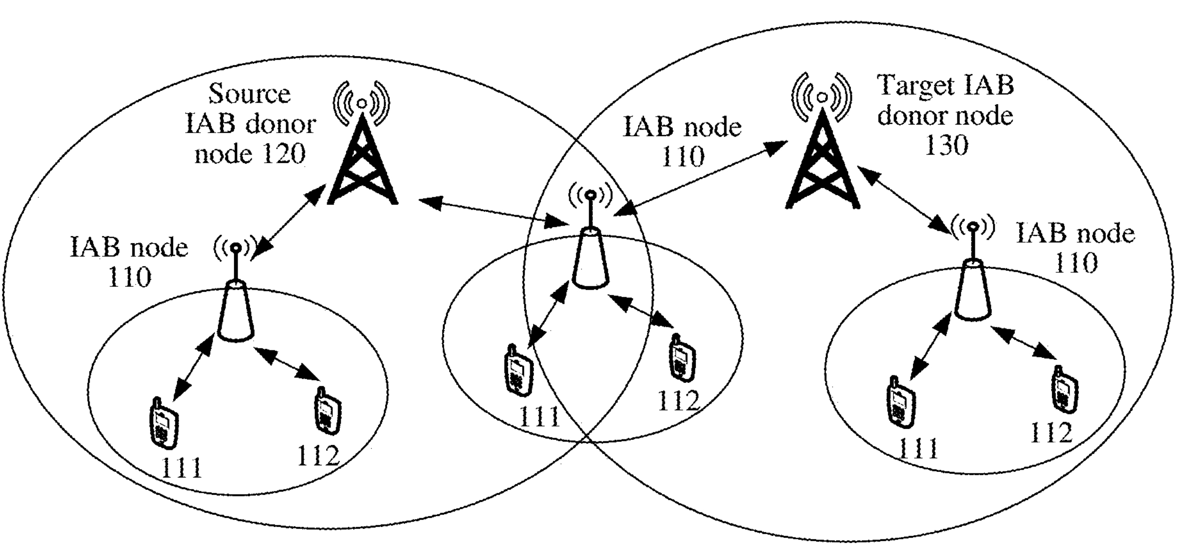
FIG. 6 is a diagram of a communication system to which an embodiment of this application is applicable.

FIG. 6 is a diagram of a communication system to which an embodiment of this application is applicable. As shown in FIG. 6, the mobile communication system 100 may include a mobile IAB node 110, a source IAB donor node 120, and a target IAB donor node 130. Child nodes of the mobile JAB node 110 include a terminal device 11 and a terminal device 112. First, the mobile IAB node is in coverage of the source IAB donor node, and accesses the source IAB donor node. Second, as the mobile IAB node moves, the mobile JAB node enters an overlapping area covered by the source IAB donor node and the target IAB donor node. As the mobile IAB node moves, the mobile IAB node enters coverage of the target IAB donor node. In this case, the mobile IAB node performs a handover process, and switches from a dual-connection state of connecting to both the source IAB donor node and the target IAB donor node to a single-connection state of connecting to only the target IAB donor node. In a process in which the mobile IAB node hands over from the source IAB donor node to the target IAB donor node, an IAB node dual-connection establishment method provided in this application may be used for donor node handover.

It should be noted that, for ease of understanding, FIG. 6 is merely a diagram in which the mobile IAB node and the child nodes of the mobile IAB node that are included in the communication system 100 are handed over from the source donor node 120 to the target donor node 130. However, this shall not constitute any limitation on this application. The communication system 100 may further include more network nodes. For example, the child nodes of the mobile IAB node 110 may further include more terminal devices and/or JAB nodes. The IAB donor node, the IAB node, and the terminal device that are included in the communication system shown in FIG. 6 may be the IAB donor node, the IAB node, and the terminal device that are in the foregoing various forms. Details are not described one by one in the figure in embodiments of this application.

It should be noted that all embodiments of this application are applicable to a mobile IAB scenario, and are also applicable to an IAB node handover scenario (that is, a scenario in which an IAB node is stationary, and handover occurs due to quality of a link between the IAB node and a donor node). In addition, this application is also applicable to a non-IAB node scenario, for example, a satellite base station scenario. In a process in which a satellite base station moves, a plurality of terminal devices served by the satellite base station perform a group granularity handover procedure. It should be understood that this is not limited in embodiments of this application.

For ease of understanding of this application, in the following embodiments, an example in which the first device is an IAB node is mainly used for description.

Figure 7:
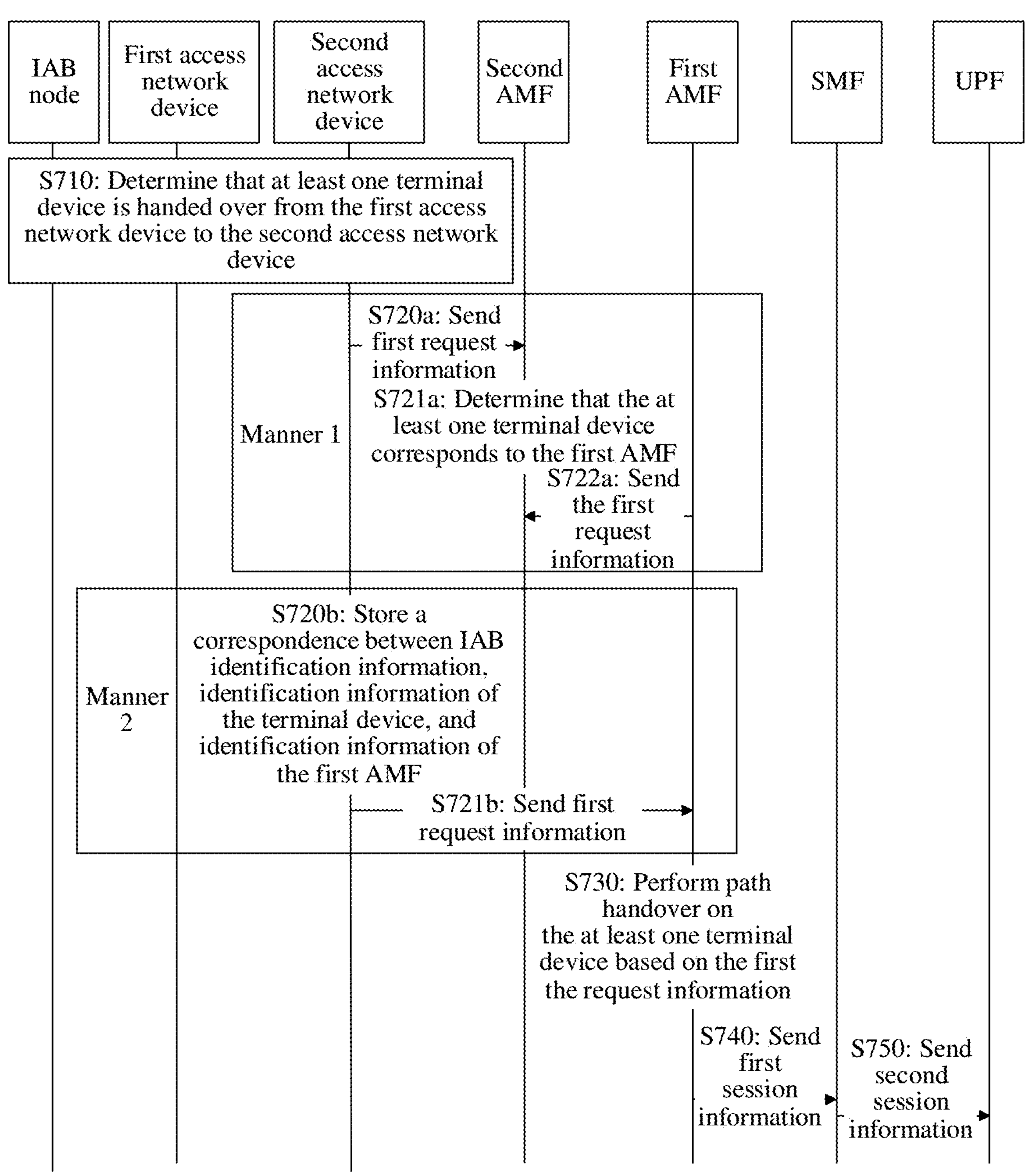
FIG. 7 is a diagram of an IAB node handover method according to an embodiment of this application.

FIG. 7 is a schematic flowchart of an IAB node handover method according to an embodiment of this application. The method includes at least the following steps.

S710: An access network device determines that at least one terminal device is handed over from a first access network device to a second access network device.

Specifically, the access network device may be the first access network device (for example, a donor IAB1), or may be the second access network device (for example, a donor IAB2). In a process in which an IAB node moves, the first access network device or the second access network device determines that the IAB node is handed over from the first access network device to the second access network device. Because the at least one terminal device accesses a network by using the IAB node, in a process in which the IAB node is handed over from the first access network device to the second access network device, the at least one terminal device of the IAB node is also handed over from the first access network device to the second access network device along with the IAB node.

It should be noted that, in this case, the at least one terminal device of the IAB node has completed air interface side handover from the first access network device to the second access network device. In other words, the terminal device of the IAB node has completed establishment of a connection to the second access network device.

It should be understood that the first access network device may also be referred to as a source access network device, and the second access network device may also be referred to as a target access network device. This is not limited in embodiments of this application.

Optionally, in a possible implementation, before S720, the method may further include: The second access network device obtains IAB identification information, where the IAB identification information identifies the IAB node.

Optionally, before S720, the method may further include: The second access network device determines a same first AMF for the at least one terminal device of the IAB node based on the obtained IAB identification information.

Specifically, the first AMF may be a UE AMF. The second access network device may determine, based on a cell identifier of the network accessed by the terminal device, that the cell identifier is a cell corresponding to the IAB node, to determine that the at least one terminal device accesses the network by using the cell corresponding to the IAB node, and select a same AMF for the at least one terminal device of the IAB node as much as possible.

For example, if the second access network device determines that the at least one terminal device (for example, UE1, UE2, and UE3) accesses the network by using the IAB node, the second access network device selects a same AMF (the first AMF) for UE1, UE2, and UE3 as much as possible.

In another possible implementation, before the IAB node is handed over from the first access network device to the second access network device, that is, when the IAB node accesses the first access network device, the first access network device may also determine that the at least one terminal device accesses the network by using the cell corresponding to the JAB node, and select the same AMF for the at least one terminal device of the IAB node as much as possible. In the process in which the JAB node is handed over from the first access network device to the second access network device, the first access network device exchanges the IAB identification information and identification information of the first AMF with the second access network device.

It should be noted that the IAB identification information may be the cell identifier of the cell corresponding to the IAB node, a radio network temporary identifier (RNTI) of the IAB node, a temporary mobile subscriber identity (s-temporary mobile subscriber identity, S-TMSI), or the like. It should be understood that this is not limited in embodiments of this application.

S720: The second access network device sends first request information to the first AMF, and correspondingly the first AMF receives the first request information sent by the second access network device.

Specifically, the first request information notifies the first AMF to perform path handover on the at least one terminal device, the first AMF serves the at least one terminal device of the IAB node, the first request information includes at least one first request message, and the at least one request message is in one-to-one correspondence with the at least one terminal device.

The second access network device may send the first request information to the first AMF in the following two manners.

Manner 1: The second access network device may specifically send the first request information to the first AMF through a second AMF by performing the following steps.

S720*a*: The second access network device sends the first request information to the second AMF, and correspondingly the second AMF receives the first request information sent by the second access network device.

S721*a*: The second AMF determines, based on an obtained correspondence between identification information of the at least one terminal device and the identification information of the first AMF, the at least one terminal device and the first AMF corresponding to the at least one terminal device.

Specifically, in a possible implementation, the second AMF may be an IAB AMF, the first request information notifies the first AMF to perform path handover on the at least one terminal device, and the first request information includes the correspondence between the identification information of the at least one terminal device and the identification information of the first AMF. Therefore, after receiving the first request information, the second AMF determines, based on the correspondence that is between the identification information of the at least one terminal device and the identification information of the first AMF and that is included in the first request information, that the at least one terminal device corresponds to the first AMF.

It should be noted that the identification information of the terminal device may be an RNTI of the terminal device, an S-TMSI, a subscriber permanent identifier (SUPI), or the like; and the identification information of the IAB node may be cell identification information corresponding to a cell covered by the IAB node, or an RNTI, an S-TMSI, or an SUPI of the IAB node. It should be understood that this is not limited in embodiments of this application.

S722*a*: The second AMF sends the first request information to the first AMF, and correspondingly the first AMF receives the first request information sent by the second AMF.

Specifically, the second AMF sends the first request information to the first AMF. The first request information includes the at least one request message corresponding to the at least one terminal device. To be specific, the first request information may be considered as a request list List including request messages (a message 1, a message 2, and a message 3) of the at least one terminal device (for example, UE1, UE2, and UE3).

In an example, when the second AMF receives the correspondence between the identification information (for example, a UE1 ID, a UE2 ID, and a UE3 ID) of the at least one terminal device and the first AMF identification information (for example, a UE AMF1 ID), the second AMF determines that UE1, UE2, and UE3 all correspond to UE AMF1. In this case, the second AMF sends handover request messages (the message 1, the message 2, and the message 3) of UE1, UE2, and UE3 to the first AMF (UE AMF1).

In an example, when the second AMF receives the correspondence between the identification information (for example, a UE1 ID, a UE2 ID, and a UE3 ID) of the at least one terminal device and the first AMF identification information (for example, a UE AMF1 ID and a UE AMF2 ID), the second AMF determines that UE1 and UE2 correspond to UE AMF1, and UE3 corresponds to UE AMF2. In this case, the second AMF splits the first request information (the handover request list List) based on the foregoing correspondence and different first AMFs. In other words, the second AMF sends the request messages (the message 1 and the message 2) of UE1 and UE2 to UE AMF1, and sends the request message (the message 3) of UE3 to UE AMF2.

Optionally, in another possible implementation, it is assumed that the first request information in step S720*a* does not include the correspondence between the identification information of the at least one terminal device and the identification information of the first AMF, that is, the second access network device does not send the correspondence between the identification information of the at least one terminal device and the identification information of the first AMF to the second AMF.

In this case, before step S721*a*, the method may further include: The second access network device or the first access network device sends the correspondence between the identification information of the at least one terminal device and the identification information of the first AMF to the second AMF. Therefore, the second AMF determines, based on the correspondence obtained from the first access network device or the second access network device, the first AMF corresponding to the at least one terminal device.

Manner 2: The second access network device may specifically send the first request information to the first AMF based on a correspondence by performing the following steps.

S720*b*: The second access network device stores a correspondence between the IAB identification information, identification information of the at least one terminal device, and identification information of the first AMF network element.

Specifically, the second access network device may determine, based on a cell corresponding to the network accessed by the terminal device being the cell corresponding to the IAB, that the at least one terminal device accesses a corresponding AMF network element by using the cell corresponding to the IAB, to determine the correspondence between the IAB identification information, the identification information of the terminal device, and the first AMF network element.

S721*b*: The second access network device sends the first request information to the first AMF based on the correspondence.

In a possible implementation, before the IAB node is handed over, that is, when the IAB node accesses the first access network device, the first access network device selects the same first AMF for the at least one terminal device of the IAB node based on the IAB identification information, and stores the IAB identification information, the identification information of the at least one terminal device, and the identification information of the first AMF in the first access network device. After the IAB node is handed over from the first access network device to the second access network device, the first access network device migrates context information of the JAB node and context information of the at least one terminal device of the IAB node to the second access network device.

In another possible implementation, when the IAB node and the at least one terminal of the IAB node are handed over, the second access device determines, based on a cell accessed by the at least one terminal device, that the cell is the cell corresponding to the IAB node, to determine a correspondence between the IAB node, the at least one terminal device, and a first AMF that serves the at least one terminal device. Information about the first AMF that serves the at least one terminal device is notified to the second access network device in a process of terminal device context information migration between the first access network device and the second access network device.

In this case, the second access network device determines the corresponding first AMF for the at least one terminal device of the IAB node, and sends the first request information to the first AMF based on the correspondence between the at least one terminal device and the first AMF. The first request information includes at least one request message corresponding to the at least one terminal device. To be specific, the first request information may be considered as a request list including request messages (a message 1, a message 2, and a message 3) of the at least one terminal device (for example, UE1, UE2, and UE3).

In an example, the second access network device determines, based on the obtained correspondence between the identification information (for example, a UE1 ID, a UE2 ID, and a UE3 ID) of the at least one terminal device of the IAB node and the first AMF identification information (for example, a UE AMF1 ID), that UE1, UE2, and UE3 correspond to UE AMF1. In this case, the second access network device sends handover request messages (the message 1, the message 2, and the message 3) of UE1, UE2, and UE3 to the first AMF (UE AMF1).

In an example, the second access network device determines, based on the obtained correspondence between the identification information (for example, a UE1 ID, a UE2 ID, and a UE3 ID) of the at least one terminal device of the IAB node and the first AMF identification information (for example, a UE AMF1 ID and a UE AMF2 ID), that UE1 and UE2 correspond to UE AMF1, and UE3 corresponds to UE AMF2. In this case, the second access network device splits the first request information (the handover request list List) based on the foregoing correspondence and different first AMFs. In other words, the second access network device sends the request messages (the message 1 and the message 2) of UE1 and UE2 to UE AMF1, and sends the request message (the message 3) of UE3 to UE AMF2.

S730: The first AMF performs path handover on the at least one terminal device based on the first request information.

Specifically, that the first AMF performs path handover on the at least one terminal device of the IAB node in a unit of a user group based on the received first request information may be understood as that the at least one terminal device of the IAB node is considered as one user group, and group handover in a unit of a user group is implemented in a path handover process.

It should be noted that the user group may be a virtual concept. It may be understood that, in embodiments of this application, the terminal devices of the IAB node are not used as a real user group, but at least one terminal device of the IAB node is handed over with the IAB node in a unit of a group when the IAB node moves and is handed over.

For example, the first AMF (UE AMF1) hands over the IAB node and the at least one terminal device (for example, UE1, UE2, and UE3) of the IAB node in a unit of a group.

Optionally, in a possible implementation, the method may further include: The first AMF stores a correspondence between the JAB identification information, identification information of the at least one terminal device, identification information of an SMF network element, and identification information of a PDU session.

Optionally, the method may further include: S740: The first AMF sends first session information to a session management network element, and correspondingly the session management network element receives the first session information sent by the first AMF.

Specifically, the session management network element may be an SMF network element, and the first session information is used to create or update a context of a PDU session of the at least one terminal device. The first session information includes at least one first session message, and the first session message is in one-to-one correspondence with the PDU session of the at least one terminal device. In other words, the first session information may be considered as an information list List including first session messages (the message 1, the message 2, and the message 3) corresponding to PDU sessions (a PDU session 1, a PDU session 2, and a PDU session 3) of the at least one terminal device (for example, UE1, UE2, and UE3).

It should be understood that the first session information may be a session management context update message in the PDU session, that is, an Nsmf_PDUSession_UpdateSMContext service message. This is not limited in embodiments of this application.

It should be understood that the first session information may be session update information, session creation information, or PDU session creation information. This is not limited in embodiments of this application.

Optionally, before S740, the method may further include: The first AMF obtains the IAB identification information, and selects a same SMF for the at least one terminal device of the IAB node as much as possible based on the IAB identification information. For example, if the first AMF determines, based on the IAB identification information, that the at least one terminal device (for example, UE1, UE2, and UE3) accesses the network by using the JAB node, the first AMF selects the same session management network element for the PDU sessions of UE1, UE2, and UE3 as much as possible.

In an example, the first AMF determines that a PDU session 1*a* and a PDU session 1*b* of UE1, a PDU session 2*a* of UE2, and a PDU session 3*a* of UE3 all correspond to the session management network element (for example, SMF1). In this case, the first AMF sends first session messages (for example, a message 1*a*, a message 1*b*, a message 2*a*, and a message 3*a*) corresponding to the PDU session 1*a* and the PDU session 1*b* of UE1, the PDU session 2*a* of UE2, and the PDU session 3*a* of UE3 to SMF1.

In an example, the first AMF determines that the PDU sessions 1*a* and 1*b* of UE1 and the PDU session 2*a* of UE2 correspond to a session management network element (for example, SMF1), and the PDU session 3*a* of UE3 corresponds to a session management network element (for example, SMF2). In this case, the first AMF network element splits the first session information (the session information list List) based on the foregoing correspondence and different session management network elements. To be specific, the first AMF sends the first session messages (the message 1*a*, the message 1*b*, and the message 2*a*) corresponding to the PDU sessions 1*a* and 1*b* of UE1 and the PDU session 2*a* of UE2 to SMF1, and sends the first session message (the message 3*a*) corresponding to the PDU session 3*a* of UE3 to SMF2.

Optionally, in a possible implementation, before S740, the method may further include: The first access network device or the second access network device sends second request information to the first AMF, and correspondingly the first AMF receives the second request information, where the second request information includes the IAB identification information.

It should be understood that the second request information may be an N2 message sent to the AMF network element. For example, the second request information may include a network registration request message, or the second request information may include a PDU session establishment or modification message. This is not limited in embodiments of this application.

In a possible implementation, if the second request information includes the PDU session modification message that may carry PDU session identification information, the method may include: The first AMF network element stores a correspondence between the identification information of the at least one terminal device, the IAB identification information, the PDU session identification information, and session management network element identification information.

S750: The session management network element sends second session information to a user plane function network element, and correspondingly the user plane function network element receives the second session information sent by the session management network element.

Specifically, the session management network element may be an SMF network element, the user plane function network element may be a UPF network element, and the second session information is used to update an N4 session context. The second session information includes at least one second session message, and the second session message is in one-to-one correspondence with the PDU session of the at least one terminal device. It may be understood that the second session information is considered as an information list List including second session messages (a message 1*a*, a message 1*b*, a message 2*a*, and a message 3*a*) corresponding to the at least one terminal device (for example, a PDU session 1*a* and a PDU session 1*b* of UE1, a PDU session 2*a* of UE2, and a PDU session 3*a* of UE3). It should be understood that the second session information may be an N4 session modification message.

Optionally, in a possible implementation, the first session request information includes the IAB identification information, and the method may further include: The session management network element selects a same user plane function network element for the at least one terminal device of the IAB node as much as possible based on the IAB identification information. For example, if the session management network element determines, based on the IAB identification information, that the at least one terminal device (for example, UE1, UE2, and UE3) accesses the network by using the IAB node, the session management network element selects the same user plane function network element for the PDU sessions of UE1, UE2, and UE3 as much as possible.

In an example, the session management network element determines that the PDU sessions 1*a* and 1*b* of UE1, the PDU session 2*a* of UE2, and the PDU session 3*a* of UE3 correspond to a user plane function network element (for example, UPF1). In this case, the session management network element sends the second session messages (the message 1*a*, the message 1*b*, the message 2*a*, and the message 3*a*) corresponding to the PDU sessions of UE1, UE2, and UE3 to UPF1.

In an example, the session management network element determines that the PDU sessions 1*a* and 1*b* of UE1 and the PDU session 2*a* of UE2 correspond to a user plane function network element (for example, UPF1), and the PDU session 3*a* of UE3 corresponds to a user plane function network element (for example, UPF2). In this case, the session management network element splits the second session information (the session information list List) based on the foregoing correspondence and different user plane function network elements. To be specific, the session management network element sends the second session messages (the message 1*a*, the message 1*b*, and the message 2*a*) corresponding to the PDU sessions 1*a* and 1*b* of UE1 and the PDU session 2*a* of UE2 to UPF1, and sends the second session message (the message 3*a*) corresponding to the PDU session 3*a* of UE3 to UPF2.

It should be noted that the second session messages (the message 1*a*, the message 1*b*, the message 2*a*, and the like) described above are in one-to-one correspondence with the PDU sessions (the session 1*a*, the session 1*b*, the session 2*a*, and the like) of the UE. However, in embodiments of this application, whether the second session message is completely the same as the second session message that is separately sent is not limited. In other words, whether PDU session messages of a plurality of corresponding terminal devices for group processing are completely the same as PDU session messages of a plurality of terminal devices for separate processing is not limited in embodiments of this application.

Optionally, in a possible implementation, before S750, the method may further include: The session management network element stores a correspondence between identification information of the at least one terminal device, the IAB identification information, identification information of the PDU session, and identification information of the UPF network element, to determine the session management network element.

Optionally, in a possible implementation, the method may further include S760: The user plane function network element updates an N4 session context of the PDU session of the at least one terminal device based on the second session information.

The foregoing technical solution can ensure group handover in a unit of a user group in a mobile IAB node, reduce signaling impact and signaling overheads for a core network, and ensure UE service continuity.

Figure 8A:
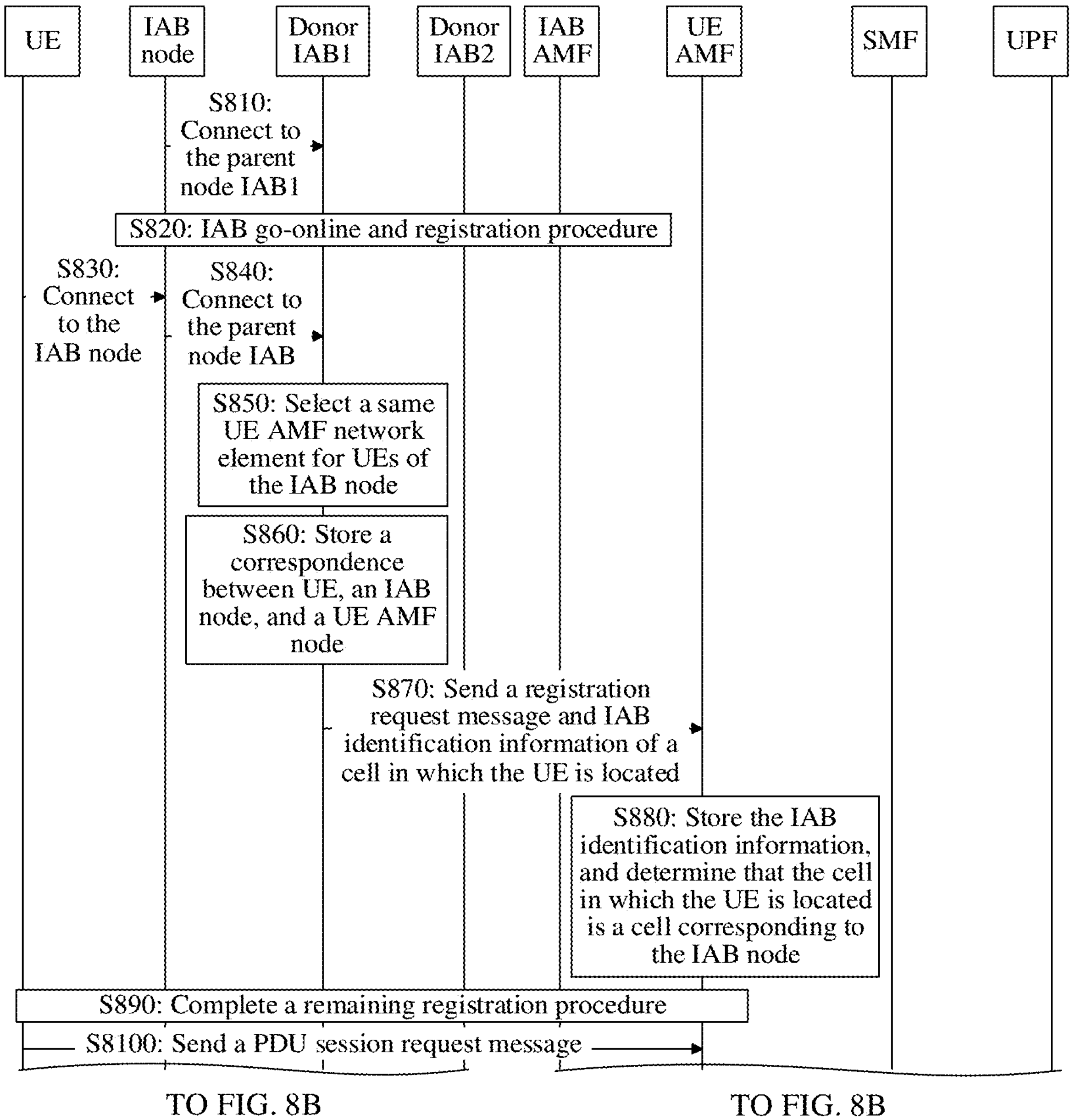
FIG. 8A and FIG. 8B are a diagram of another IAB node handover method according to an embodiment of this application.
Figure 8B:
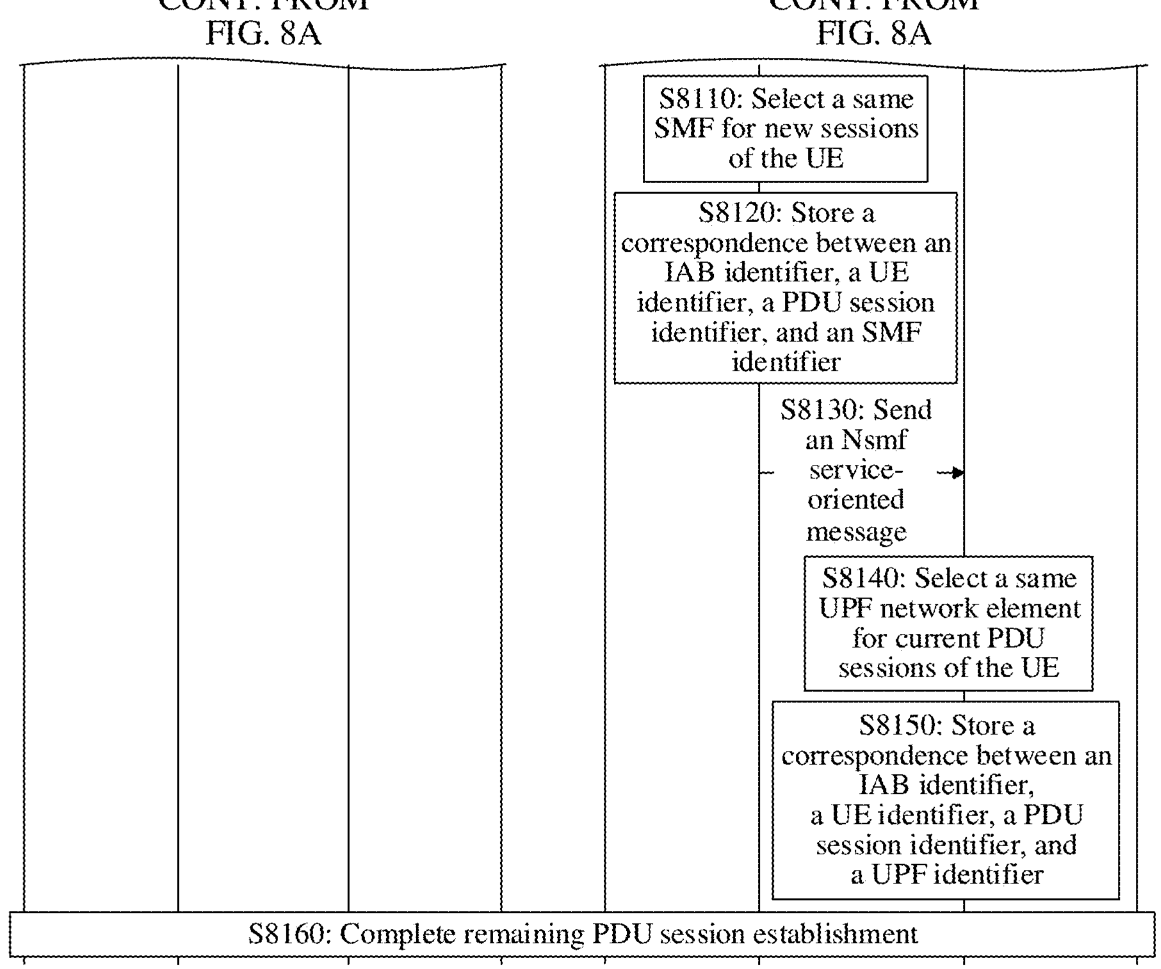

FIG. 8A and FIG. 8B are a schematic flowchart of an IAB node handover method according to an embodiment of this application. The method includes at least the following steps.

S810: An IAB node completes establishment of a connection to a donor IAB1.

Specifically, the IAB node accesses parent node donor IAB1 of the IAB node, to complete the establishment of the connection to the donor IAB1. It should be noted that the donor IAB1 may also be considered as a fixed base station, for example, a donor gNB1.

S820: The IAB node sends a registration request message to an IAB AMF, to complete a go-online and registration process of the IAB node.

Specifically, the IAB node performs network registration through the connection established in step S810, the IAB node sends the registration request message to the IAB AMF, and the donor IAB node adds IAB node indication information to the sent registration request message, to complete the go-online and registration process of the IAB node. The IAB node indication information indicates that UE currently performing registration is an IAB node. Then, the donor IAB1 node configures the IAB node by using an F1AP interface, including information such as a cell and a frequency band corresponding to the IAB node, to implement activation of a cell corresponding to the IAB node.

S830 and S840: The UE establishes an RRC connection to the parent node donor IAB by using the IAB node.

Specifically, after the cell corresponding to the IAB node is activated, and after the UE is powered on and listens to a broadcast of the cell corresponding to the IAB node, and selects to attach to the cell, the UE establishes an RRC connection to the cell, that is, performs a network connection establishment process. Then, the UE sends a registration request message to an AMF.

S850: The donor IAB1 selects a same AMF network element for the UEs of the IAB node as much as possible.

Specifically, the donor IAB1 node may determine that the UE accesses a network by using the cell (cell) corresponding to the IAB node, and select a same UE AMF network element for at least one UE of the IAB as much as possible. For example, when selecting the UE AMF network element, the donor IAB1 node considers a UE AMF network element selected by another UE that accesses the network by using the IAB, that is, selects the same UE AMF for the at least one UE of the IAB node as much as possible. Alternatively, it may be considered that, when a UE AMF network element is select for $1^{st}$ UE of the IAB, an AMF network element that supports a relatively large quantity of slice types or a largest quantity of slice types is selected.

S860: The donor IAB1 stores a correspondence between UE, an JAB node, and a UE AMF network element.

Specifically, after selecting the UE AMF for the at least one UE of the IAB node, the donor IAB1 stores a correspondence between UE identification information (for example, a UE RNTI, an S-TMSI, or an SUPI), IAB identification information (for example, an IAB ID or an IAB cell ID), and UE AMF network element identification information (for example, a UE AMF ID), to determine a user group corresponding to the selected UE AMF network element of the IAB node.

It should be noted that S860 may be an optional step, that is, the donor IAB1 may not store the correspondence between UE, an IAB node, and a UE AMF network element. It may be understood that the donor IAB1 can learn of a cell in which UE is located and a selected UE AMF network element.

S870: The donor IAB1 sends a registration request message to the UE AMF, and correspondingly the UE AMF receives the registration request message.

Specifically, when sending the registration request message from the UE to a UE AMF side, the parent node donor IAB sends, in a corresponding N2 message, IAB identification information of the cell in which the UE is located to the UE AMF, that is, sends the IAB identification information together with the registration request message to the UE AMF side. The IAB identification information may be an IAB SUPI, or may be identification information of a cell corresponding to the IAB. It should be understood that this is not limited in embodiments of this application.

S880: The UE AMF stores the JAB identification information from the donor IAB1, and determines that the cell in which the UE is located is the cell corresponding to the IAB node.

In a possible implementation, the UE AMF may alternatively receive the JAB identification information from another network element, for example, an OAM system.

S890: Complete a remaining registration procedure.

It should be noted that, for the registration procedure, refer to an existing registration procedure. Details are not described herein in embodiments of this application.

S8100: When the UE needs to initiate a service, the UE sends a PDU session establishment request message to the UE AMF, and correspondingly the UE AMF receives the PDU session request message.

Specifically, after the UE completes the foregoing registration procedure, the UE initiates a service session establishment procedure, that is, a PDU session establishment procedure, to the UE AMF.

Optionally, in a possible implementation, in a process of sending the PDU session establishment request message to the UE AMF side, the parent node donor IAB sends the PDU session request message and the IAB identification information to the AMF side by using the N2 message.

S8110: The UE AMF selects a same SMF for the at least one UE of the JAB node.

Specifically, the UE AMF determines, based on the IAB identification information, that the at least one terminal device accesses the network by using the IAB node. In this case, when selecting an SMF, the UE AMF comprehensively considers an SMF selection status of another UE of the IAB node, and selects a same SMF as much as possible. For example, when selecting the SMF network element, the donor IAB1 node considers an SMF network element selected by another UE that accesses the network by using the IAB, that is, selects the same SMF for the at least one UE of the IAB node as much as possible. Briefly, the UE AMF selects a minimum quantity of SMFs for the UE of the IAB node as much as possible, that is, reduces a total quantity of SMFs of the UE of the IAB node, to reduce a quantity of signaling exchanges through group processing.

S8120: The UE AMF stores a correspondence between at least one terminal device, an IAB node, a PDU session, and an SMF.

Specifically, the UE AMF stores a correspondence between the IAB node identification information, identification information of the at least one terminal device, PDU session identification information, and SMF identification information, that is, determines a specific SMF network element selected for a specific PDU session of specific UE of the cell corresponding to the IAB node. It should be noted that the stored correspondence is used as a basis for subsequent group processing.

S8130: The UE AMF sends an Nsmf service-oriented message to the SMF to create or modify a session management context of the PDU session, and correspondingly the SMF receives the Nsmf service-oriented message.

Specifically, the UE AMF sends the PDU session request message from the UE to an SMF side by using the Nsmf service-oriented message. Optionally, in a possible implementation, the UE AMF may add the IAB identification information to the PDU session request message or the Nsmf service-oriented message, to indicate the SMF to perform group handover optimization processing. The Nsmf service-oriented message may be Nsmf_PDUSession_UpdateSMContext.

S8140: The SMF selects a same UPF network element for the at least one terminal device of the IAB node.

Specifically, the SMF may determine, based on the IAB identification information, that the UE accesses the network by using the cell corresponding to the IAB node, and select the same UPF network element for the at least one UE of the IAB as much as possible. For example, when selecting the UPF network element, the SMF considers a UPF network element selected by another UE that accesses the network by using the IAB, that is, selects the same UPF network element for the at least one UE of the IAB node as much as possible.

S8150: The SMF stores a correspondence between at least one terminal device, an IAB node, a PDU session, and a UPF.

Specifically, the SMF stores a correspondence between identification information of the at least one terminal device, the IAB identification information, PDU session identification information, and UPF identification information. During subsequent group handover, a group N4 session modification procedure is triggered.

S8160: Complete a remaining PDU session establishment procedure. It should be noted that, for the PDU session establishment procedure, refer to an existing procedure. Details are not described herein in embodiments of this application.

Based on the foregoing technical solution, user core network elements of an IAB node can keep consistent as much as possible, and a group relationship is maintained between different core network elements, so as to prepare for implementing group handover in a unit of a user group of a mobile IAB node. This ensures group handover in a unit of a user group in the mobile IAB node, reduces signaling impact and signaling overheads for a core network, and ensures UE service continuity.

Figure 9A:
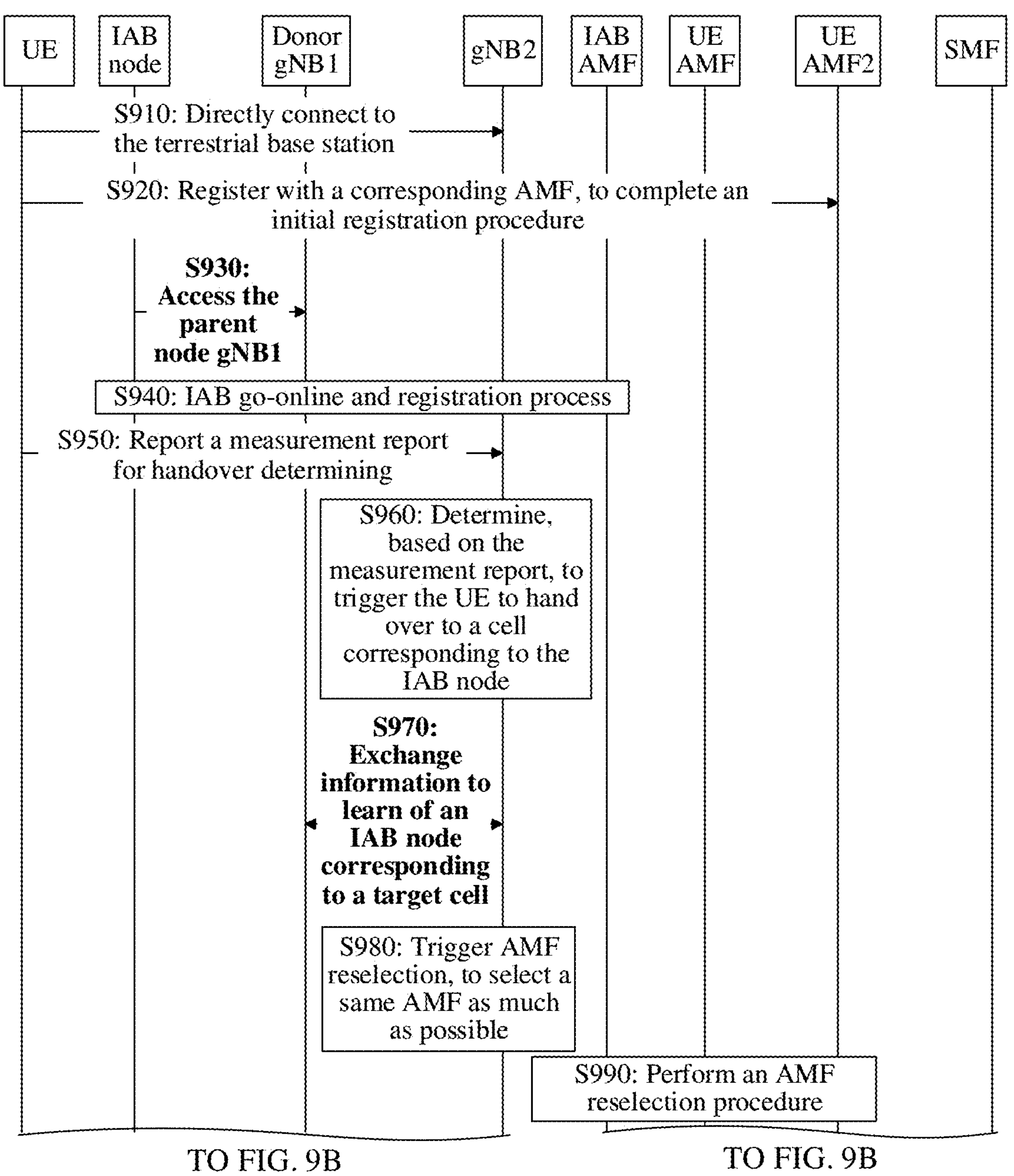
FIG. 9A and FIG. 9B are a diagram of another IAB node handover method according to an embodiment of this application.
Figure 9B:
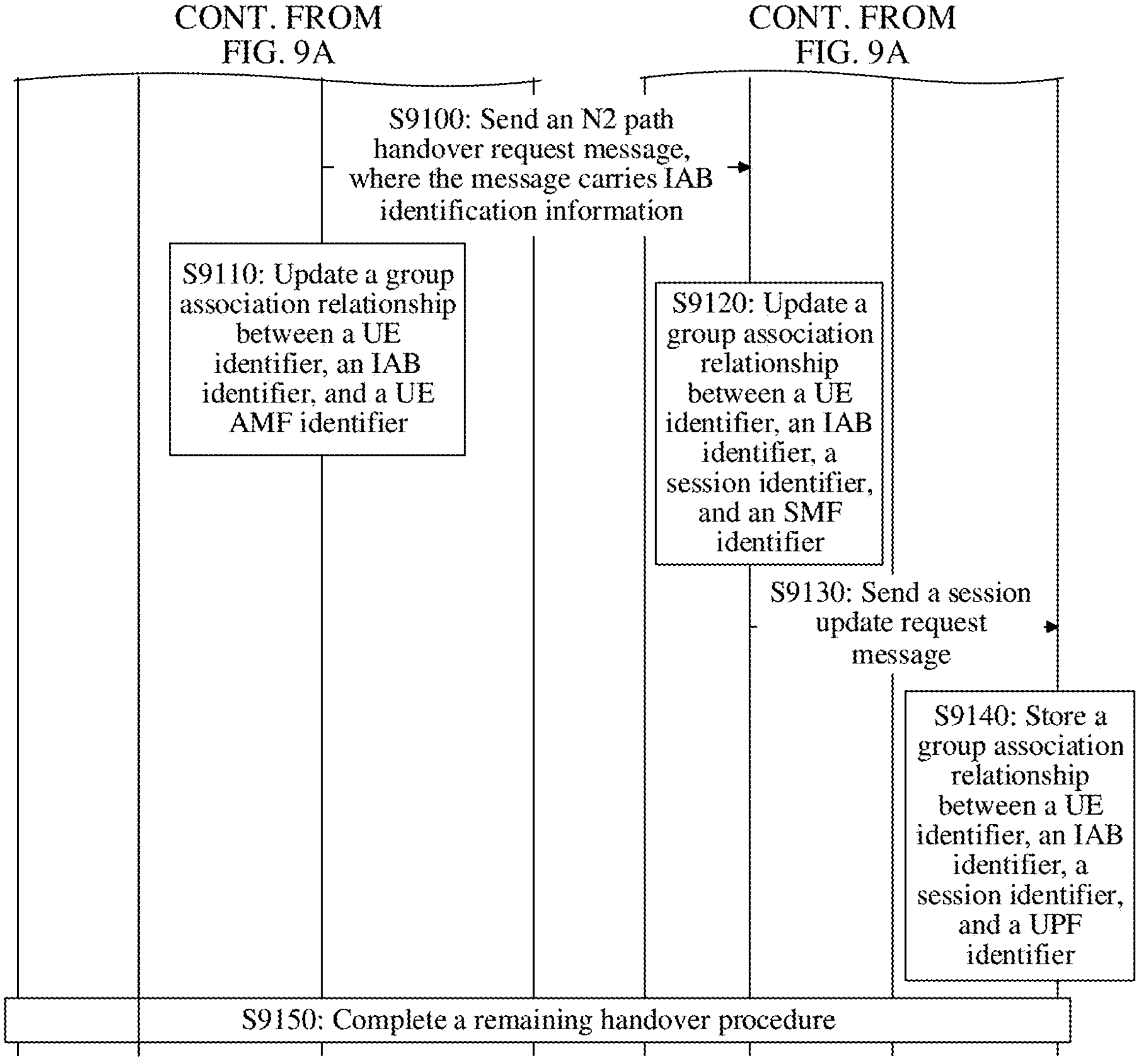

FIG. 9A and FIG. 9B are a schematic flowchart of an IAB node handover method according to an embodiment of this application. The method includes at least the following steps.

S910: UE directly connects to a terrestrial base station gNB2, that is, the UE accesses a network by using a cell corresponding to the gNB2, and does not indirectly access a network side by using a cell corresponding to an IAB node.

S920: The UE registers with a corresponding UE AMF by using a terrestrial base station node, to complete an initial registration procedure. Subsequently, optionally, the UE may establish a service session by using the terrestrial base station node.

S930: In an IAB go-online and registration process, after the IAB node is deployed, the IAB node accesses a parent node donor gNB1 of the IAB node, to complete establishment of a connection to the donor gNB1.

It should be understood that S930 is an optional step.

S940: The IAB node sends a registration request message to an IAB AMF, and correspondingly the JAB AMF receives the registration request message.

Specifically, the JAB node performs a registration procedure through the connection established in the foregoing step, and sends the registration request message to an AMF side corresponding to the IAB. The registration request message carries IAB node indication information, to complete an IAB go-online and registration process. Then, the donor IAB1 node configures the IAB node by using an F1AP interface, including information such as a cell and a frequency band corresponding to the IAB node, to implement activation of a cell corresponding to the IAB node.

It should be noted that there is no specific sequence of performing S910 and S920 and S930 and S940. In other words, S930 and S940 may be performed before S910 and S920. It should be understood that the sequence of performing the foregoing steps is not limited in this application.

S950: The UE reports measurement report information to the gNB2.

Specifically, the UE reports the measurement report information to the terrestrial base station gNB2. The measurement report information includes information such as identification information of a neighboring cell and signal strength corresponding to each cell, to ensure that the gNB2 can sense signal strength statuses of different cells on a UE side in time, and determine whether to trigger the UE to perform cell handover.

S960: The gNB2 determines, based on the measurement report information reported by the UE, to hand over to a cell corresponding to the IAB node.

S970: The gNB2 exchanges information with the donor gNB1.

Specifically, the gNB2 determines the IAB node corresponding to the cell to which the UE is handed over, and obtains IAB identification information of the IAB node and identification information of a selected UE AMF. It should be noted that the donor gNB1 may send the information to the gNB2 in a form of a context, or the donor gNB1 actively notifies the gNB2. It should be understood that this is not limited in embodiments of this application.

S980: The gNB2 may trigger AMF reselection, to select a same UE AMF for at least one UE of the IAB node as much as possible.

Optionally, in a possible implementation, the method may further include S990. When selecting a new AMF node, the gNB2 selects a same AMF node for UEs of the IAB node as much as possible. If an AMF node selected by the UE of the IAB node is different from a previous AMF node of the UE, an AMF relocation procedure is performed, that is, the gNB2 reselects a UE AMF for the at least one UE of the IAB node, and performs an AMF replacement procedure.

It should be understood that step S980 is an optional step.

S9100: The donor gNB1 sends an N2 path handover request message to the UE AMF, and correspondingly the UE AMF receives the N2 path handover request message, where the N2 path handover request message indicates the UE to perform path handover.

Specifically, the N2 path handover request message may include JAB identification information, and the IAB identification information indicates an IAB identifier corresponding to a cell in which the UE of the UE AMF node is located.

S9110: The donor gNB1 updates a correspondence between at least one terminal device, an IAB node, and a UE AMF.

Specifically, because a new terminal device is added to the JAB node, the donor gNB1 updates a correspondence among identification information of at least one terminal device, IAB identification information, and UE AMF identification information, to determine a correspondence between different terminal devices of the JAB node and different UE AMF network elements, and prepare for subsequent group path handover processing.

S9120: The UE AMF updates a correspondence between at least one terminal device, an JAB node, a session, and an SMF Specifically, the UE AMF receives the IAB identification information from the donor gNB1, determines, based on the IAB identification information, that the at least one UE accesses the network by using the IAB node, and updates a correspondence between identification information of at least one UE, JAB identification information, session identification information, and corresponding SMF identification information based on this.

Optionally, when the terminal device subsequently establishes a new PDU session, the UE AMF comprehensively considers an SMF selection status of another terminal device of the IAB node during SMF selection, selects a same SMF as much as possible, and continues to update the correspondence.

S9130: The UE AMF sends a session update request message to an SMF, and correspondingly the SMF receives the session update request message.

Specifically, the UE AMF sends the session update request message to the SMF by using a service-oriented Nsmf API message, where the session update request message carries the IAB identification information; and indicates, based on the IAB identification information, the SMF to subsequently perform group handover optimization processing. The Nsmf service-oriented message may be Nsmf_PDUSession_UpdateSMContext.

S9140: The SMF stores a correspondence between an IAB node, at least one terminal device, a PDU session, and a UPF network element.

Specifically, the SMF receives the IAB identification information from the UE AMF, and determines, based on the IAB identification information, that the at least one UE accesses the network by using the IAB node. In this case, the SMF updates and stores the correspondence between the identification information of the at least one terminal device, the IAB identification information, the session identification information, and the corresponding UPF identification information.

Optionally, when the terminal device subsequently establishes a new PDU session, the SMF may comprehensively consider a UPF selection status of another terminal device of the IAB node during UPF selection, and select a same UPF for the terminal devices of the JAB as much as possible.

S9150: Complete a subsequent handover procedure. It should be noted that, for the handover procedure, refer to an existing handover procedure. Details are not described herein in embodiments of this application.

Based on the foregoing technical solution, it can be ensured that user core network elements of an IAB node can keep consistent as much as possible, and a group relationship is maintained between different core network elements, so as to prepare for implementing group handover in a unit of a user group of a mobile IAB node. This reduces signaling impact and signaling overheads for a core network, and ensures UE service continuity.

Figure 10:
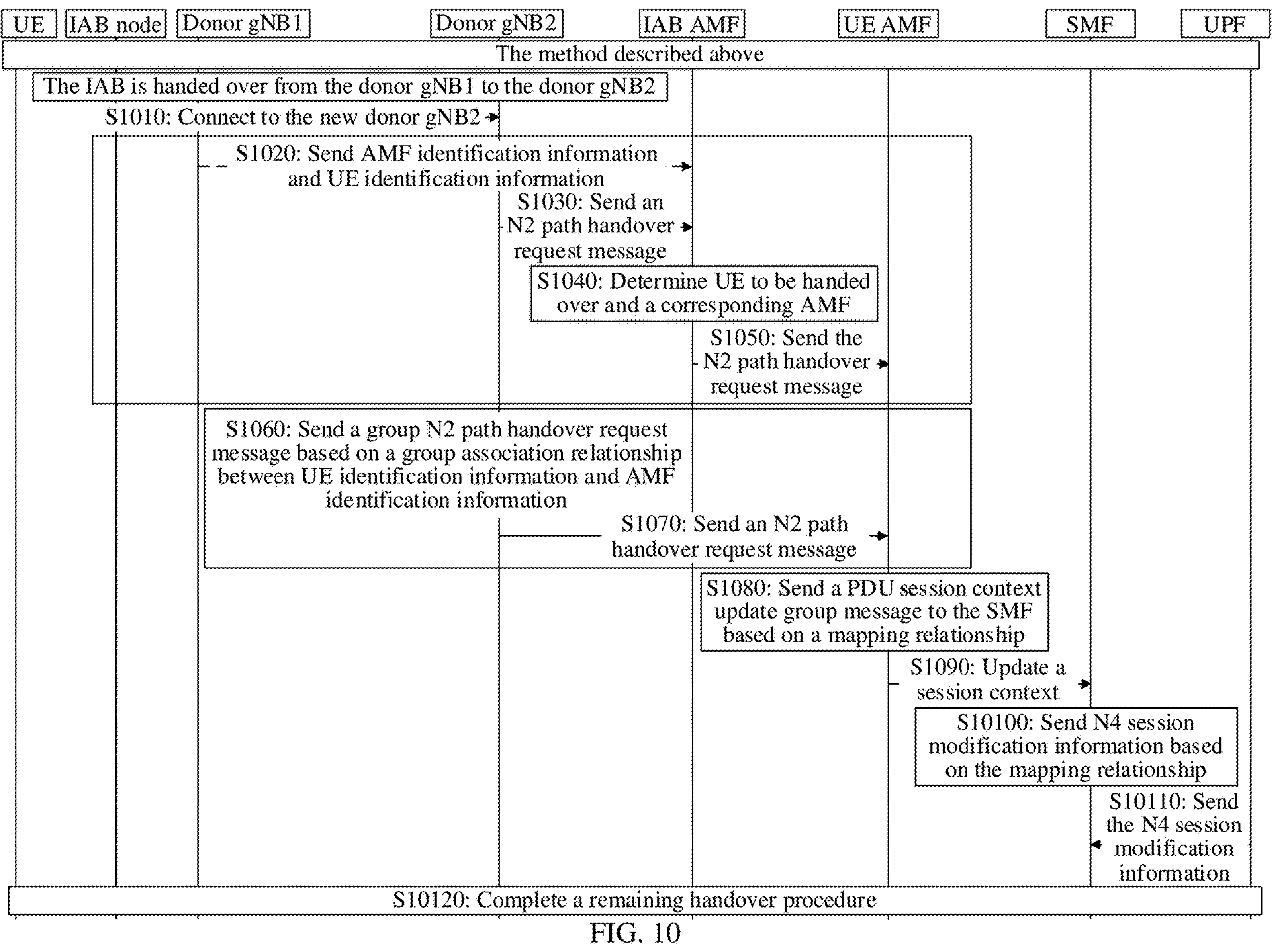
FIG. 10 is a diagram of another IAB node handover method according to an embodiment of this application.

FIG. 10 is a schematic flowchart of an IAB node handover method according to an embodiment of this application. The method includes at least the following steps. It should be noted that the method shown in FIG. 10 is a subsequent step of the method shown in FIG. 8A and FIG. 8B or FIG. 9A and FIG. 9B. It may be understood that the method shown in FIG. 10 is performed after the method shown in FIG. 8A and FIG. 8B or FIG. 9A and FIG. 9B is performed.

S1010: In a movement process, an IAB node hands over from a first access network device (a donor gNB1) to a second access network device (a donor gNB2), that is, the IAB node connects to the donor gNB2.

Specifically, it should be noted that, in this case, the IAB node has completed a handover procedure on an air interface side, that is, the IAB node has disconnected from the first access network device, to connect to the second access network device. Correspondingly, a terminal device also has completed a handover procedure on the air interface side.

S1020: The donor gNB1 sends AMF identification information and identification information of at least one terminal device to an IAB AMF.

Specifically, the donor gNB1 adds identification information of a corresponding terminal device and UE AMF identification information to an N2 message, and sends the N2 message to an IAB AMF side.

It should be understood that step S1020 is an optional step.

The donor gNB2 may send N2 path handover request information to a UE AMF in the following two manners.

Manner 1: The donor gNB2 may specifically send the N2 path handover request information to the UE AMF through the JAB AMF by performing the following steps.

S1030: The donor gNB2 sends the N2 path handover request information to the IAB AMF, and correspondingly the IAB AMF receives the N2 path handover request information.

Specifically, after an air interface side handover process is completed, the donor gNB2 determines that the JAB node is handed over, and at least one terminal device of the IAB node has also been handed over. In this case, the donor gNB2 initiates a group N2 path handover procedure. The N2 path handover request information includes at least one request message corresponding to the at least one terminal device. To be specific, the N2 path handover request information may be considered as a request list List including request messages (a message 1, a message 2, and a message 3) of the at least one terminal device (for example, UE1, UE2, and UE3).

It should be noted that a message in the request list List may be the same as or different from a message for separate handover. It should be understood that this is not limited in embodiments of this application.

Optionally, if the correspondence between the UE AMF identification information and the identification information of the at least one UE is not sent in step S1020, the donor gNB2 sends the stored correspondence between the identification information of the at least one UE and the UE AMF identification information to the JAB AMF side based on UE context information from the donor gNB1.

S1040: The IAB AMF determines at least one terminal device to be handed over and a corresponding UE AMF.

Specifically, the JAB AMF determines, based on the relationship that is between the at least one terminal device of the IAB node and the corresponding UE AMF network element and that is obtained in S1030 or S1020, different terminal device groups (user groups) corresponding to different UE AMF network elements in the at least one terminal device to be handed over.

S1050: The IAB AMF sends the N2 path handover request information to the UE AMF, and correspondingly the UE AMF receives the N2 path handover request information.

Specifically, the N2 path handover request information includes at least one request message corresponding to the at least one terminal device. To be specific, the N2 path handover request information may be considered as a request list List including request messages (a message 1, a message 2, and a message 3) of the at least one terminal device (for example, UE1, UE2, and UE3).

In an example, when the IAB AMF receives the correspondence between the identification information (for example, a UE1 ID, a UE2 ID, and a UE3 ID) of the at least one terminal device and the UE AMF identification information (for example, a UE AMF1 ID), the IAB AMF determines that UE1, UE2, and UE3 all correspond to UE AMF1. In this case, the IAB AMF sends handover request messages (the message 1, the message 2, and the message 3) of UE1, UE2, and UE3 to the UE AMF (UE AMF1).

In an example, when the JAB AMF receives the correspondence between the identification information (for example, a UE1 ID, a UE2 ID, and a UE3 ID) of the at least one terminal device and the UE AMF identification information (for example, a UE AMF1 ID and a UE AMF2 ID), the IAB AMF determines that UE1 and UE2 correspond to UE AMF1, and UE3 corresponds to UE AMF2. In this case, the IAB AMF splits the N2 path handover request information (the handover request list List) based on the foregoing correspondence and different UE AMFs. In other words, the IAB AMF sends the request messages (the message 1 and the message 2) of UE1 and UE2 to UE AMF1, and sends the request message (the message 3) of UE3 to UE AMF2.

Manner 2: The second access network device may specifically send the first request information to the first AMF based on a correspondence by performing the following steps.

S1060: The donor gNB2 stores a correspondence between the IAB identification information, identification information of the at least one terminal device, and identification information of the UE AMF network element.

It should be noted that S1060 is similar to S860, and details are not described herein in this application.

S1070: The donor gNB2 sends the N2 path handover request information to the UE AMF based on the correspondence.

Specifically, in S850 described above, in a possible implementation, before the IAB node is handed over, that is, when the IAB node accesses the donor gNB1, the donor gNB1 selects a same UE AMF for the at least one terminal device of the JAB node based on the IAB identification information, and stores the JAB identification information, the identification information of the at least one terminal device, and the UE AMF identification information in the donor gNB1. After the JAB node is handed over from the donor gNB1 to the donor gNB2, the donor gNB1 migrates context information of the IAB node and context information of the at least one terminal device of the IAB node to the donor gNB2.

In another possible implementation, when the IAB node and the at least one terminal of the IAB node are handed over, the second access device determines, based on a cell accessed by the at least one terminal device, that the cell is the cell corresponding to the IAB node, to determine a correspondence between the IAB node, the at least one terminal device, and a first AMF that serves the at least one terminal device. Information about the first AMF that serves the at least one terminal device is notified to the second access network device in a process of terminal device context information migration between the first access network device and the second access network device.

In this case, the donor gNB2 determines a corresponding UE AMF for the at least one terminal device of the IAB node, and sends the N2 path handover request information to the UE AMF based on the correspondence between the at least one terminal device and the UE AMF. The N2 path handover request information includes the at least one request message corresponding to the at least one terminal device. In other words, the N2 path handover request information may be considered as a request list including request messages (the message 1, the message 2, and the message 3) of the at least one terminal device (for example, UE1, UE2, and UE3).

In an example, the donor gNB2 determines, based on the obtained correspondence between the identification information (for example, the UE1 ID, the UE2 ID, and the UE3 ID) of the at least one terminal device and the UE AMF identification information (for example, the UE AMF1 ID), that UE1, UE2, and UE3 all correspond to UE AMF1. In this case, the donor gNB2 sends handover request messages (the message 1, the message 2, and the message 3) of UE1, UE2, and UE3 to the UE AMF (UE AMF1).

In an example, the donor gNB2 determines, based on the obtained correspondence between the identification information (for example, the UE1 ID, the UE2 ID, and the UE3 ID) of the at least one terminal device and the UE AMF identification information (for example, the UE AMF1 ID and the UE AMF2 ID), that UE1 and UE2 correspond to UE AMF1, and UE3 corresponds to UE AMF2. In this case, the donor gNB2 splits the N2 path handover request information (the handover request list List) based on the foregoing correspondence and different UE AMFs. In other words, the donor gNB2 sends the request messages (the message 1 and the message 2) of UE1 and UE2 to UE AMF1, and sends the request message (the message 3) of UE3 to UE AMF2.

S1080: The UE AMF obtains IAB identification information, and selects a same SMF for the at least one terminal device of the IAB node as much as possible based on the IAB identification information.

For example, if the UE AMF determines, based on the IAB identification information, that the at least one terminal device (for example, UE1, UE2, and UE3) accesses the network by using the IAB node, the UE AMF selects the same SMF for the PDU sessions of UE1, UE2, and UE3 as much as possible.

S1090: The UE AMF sends first session information to the SMF, and correspondingly the SMF receives the first session information sent by the UE AMF.

Specifically, the first session information is used to create or update a context of a PDU session of the at least one terminal device. The first session information includes at least one first session message, and the first session message is in one-to-one correspondence with the PDU session of the at least one terminal device. In other words, the first session information may be considered as an information list List including first session messages (a message 1*a*, a message 1*b*, a message 2*a*, and a message 3*a*) of the PDU sessions (for example, PDU sessions 1*a* and 1*b* of UE1, a PDU session 2*a* of UE2, and a PDU session 3*a* of UE3) of the at least one terminal device.

It should be understood that the first session information may be PDU session modification/update information, or PDU session creation information. This is not limited in embodiments of this application.

In an example, the UE AMF determines that the PDU sessions 1*a* and 1*b* of UE1, the PDU session 2*a* of UE2, and the PDU session 3*a* of UE3 all correspond to SMF1. In this case, the first AMF sends first session messages (the message 1*a*, the message 1*b*, the message 2*a*, and the message 3*a*) of UE1, UE2, and UE3 to SMF1.

In an example, the UE AMF determines that the PDU sessions 1*a* and 1*b* of UE1 and the PDU session 2*a* of UE2 correspond to SMF1, and the PDU session 3*a* of UE3 corresponds to SMF2. In this case, the UE AMF network element splits the first session information (the session information list List) based on the foregoing correspondence and different SMFs. To be specific, the UE AMF sends the first session messages (the message 1*a*, the message 1*b*, and the message 2*a*) of the PDU sessions corresponding to UE1 and UE2 to SMF1, and sends the first session message (the message 3*a*) of the PDU session corresponding to UE3 to SMF2.

It should be understood that S1080 and S1090 are optional steps. In other words, a group processing optimization operation on an SMF side is also an optional step.

S10100: The SMF selects a same UPF for at least one terminal device of the IAB node as much as possible based on the IAB identification information.

For example, if the SMF determines, based on the IAB identification information, that the at least one terminal device (for example, UE1, UE2, and UE3) accesses the network by using the JAB node, the SMF selects the same UPF for the PDU sessions corresponding to UE1, UE2, and UE3 as much as possible.

S10110: The SMF sends second session information to the UPF, and correspondingly the UPF receives the second session information.

Specifically, the second session information is used to update an N4 session context. The second session information includes at least one second session message, and the second session message is in one-to-one correspondence with the PDU session of the at least one terminal device. It may be understood that the second session information is considered as an information list List including second session messages (a message 1*a*, a message 1*b*, a message 2*a*, and a message 3*a*) of the PDU sessions (for example, PDU sessions 1*a* and 1*b* of UE1, a PDU session 2*a* of UE2, and a PDU session 3*a* of UE3) corresponding to the at least one terminal device.

In an example, the SMF determines that the PDU sessions 1*a* and 1*b* of UE1, the PDU session 2*a* of UE2, and the PDU session 3*a* of UE3 all correspond to UPF1. In this case, the SMF sends the second session messages (the message 1*a*, the message 1*b*, the message 2*a*, and the message 3*a*) corresponding to the PDU sessions of UE1, UE2, and UE3 to UPF1.

In an example, the SMF determines that the PDU sessions 1*a* and 1*b* of UE1 and the PDU session 2*a* of UE2 correspond to UPF1, and the PDU session 3*a* corresponding to UE3 corresponds to UPF2. In this case, the SMF splits the second session information (the session information list List) based on the foregoing correspondence and different UPFs. To be specific, the SMF sends the second session messages (the message 1*a*, the message 1*b*, and the message 2*a*) of the PDU sessions corresponding to UE1 and UE2 to UPF1, and sends the second session message (the message 3*a*) of the PDU session corresponding to UE3 to UPF2.

It should be noted that the second session information may be N4 session modification information, and the N4 session modification information may be used to modify N3 tunnel information on a base station side; or the second session information may be other information. It should be understood that this is not limited in embodiments of this application.

S10120: Complete a remaining handover procedure. It should be noted that, for the handover procedure, refer to an existing handover procedure. Details are not described herein in embodiments of this application.

The foregoing technical solution can implement group handover in a unit of a user group in the mobile IAB node, reduce signaling impact and signaling overheads for a core network, and ensure UE service continuity.

Embodiments described in this specification may be independent solutions, or may be combined based on internal logic. All these solutions fall within the protection scope of this application.

It may be understood that, in the foregoing method embodiments, methods and operations implemented by each device or network element may also be implemented by a component (for example, a chip or a circuit) of a corresponding device or network element.

The foregoing mainly describes the solutions provided in embodiments of this application from the perspective of interaction between the devices. It may be understood that, to implement the foregoing functions, each network element such as a transmit device or a receive device includes a corresponding hardware structure and/or software module for performing each function. A person skilled in the art may be aware that, in combination with the examples described in embodiments disclosed in this specification, units and algorithm steps may be implemented by using hardware or a combination of hardware and computer software in this application. Whether a function is performed by using hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, a transmit device or a receive device may be divided into function modules based on the foregoing method examples. For example, each function module corresponding to each function may be obtained through division, or two or more functions may be integrated into one processing module. The integrated module may be implemented in a form of hardware, or may be implemented in a form of a software functional module. It should be noted that, in embodiments of this application, module division is an example, and is merely a logical function division. During actual implementation, another division manner may be used. Descriptions are provided below by using an example in which each function module is obtained through division corresponding to each function.

It should be understood that specific examples in embodiments of this application are merely intended to help a person skilled in the art better understand embodiments of this application, but are not intended to limit the scope of embodiments of this application.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

The methods provided in embodiments of this application are described in detail above with reference to FIG. 7 to FIG. 10. Apparatuses provided in embodiments of this application are described in detail below with reference to FIG. 11 to FIG. 15. It should be understood that descriptions of apparatus embodiments correspond to the descriptions of the method embodiments. Therefore, for content that is not described in detail, refer to the method embodiments. For brevity, details are not described herein again.

Figure 11:
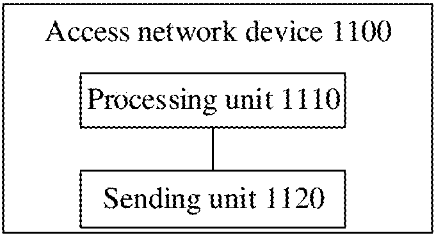
FIG. 11 is a block diagram of an access network device according to an embodiment of this application.

FIG. 11 is a block diagram of an access network device 1100 according to an embodiment of this application. It should be understood that the access network device 1100 includes a processing unit 1110 and a sending unit 1120.

The processing unit 1110 is configured to determine that at least one terminal device is handed over from a first access network device to a second access network device, where the at least one terminal device accesses a network by using an IAB node. The sending unit 1120 is configured to send first request information, where the first request information notifies a first AMF network element to perform path handover on the at least one terminal device, and the first AMF network element serves the at least one terminal device. The first request information includes at least one first request message, and the at least one first request message is in one-to-one correspondence with the at least one terminal device.

In a possible implementation, the processing unit 1110 is further configured to obtain IAB identification information, where the IAB identification information identifies the IAB node.

In a possible implementation, the processing unit 1110 is further configured to determine a same first AMF network element for the at least one terminal device based on the IAB identification information.

In a possible implementation, the processing unit 1110 is further configured to store a correspondence between the IAB identification information, identification information of the at least one terminal device, and identification information of the first AMF network element; and the sending unit is specifically configured to send the first request information to the first AMF network element based on the correspondence.

In a possible implementation, the first request information includes a correspondence between the identification information of the at least one terminal device and the identification information of the first AMF network element.

In a possible implementation, the sending unit 1120 is further configured to send the correspondence between the identification information of the at least one terminal device and the identification information of the first AMF network element to a second AMF network element, where the second AMF network element serves the JAB node.

In a possible implementation, the sending unit 1120 is further configured to send second request information to the first AMF network element, where the second request information is used to request to perform network registration, the second request information includes the IAB identification information, and the IAB identification information identifies the IAB node.

In a possible implementation, the sending unit 1120 is further configured to send third request information to the first AMF network element, where the third request information is used to request to establish a PDU session, the third request information includes the IAB identification information, and the IAB identification information identifies the IAB node.

Figure 12:
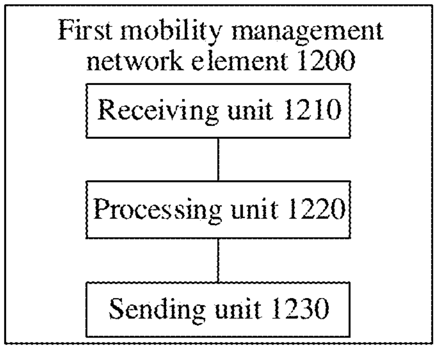
FIG. 12 is a block diagram of a first mobility management network element according to an embodiment of this application.

FIG. 12 is a block diagram of a first mobility management network element 1200 according to an embodiment of this application. It should be understood that the first mobility management AMF network element 1200 includes a receiving unit 1210, a processing unit 1220, and a sending unit 1230.

The receiving unit 1210 is configured to receive first request information, where the first request information notifies the first AMF network element to perform path handover on at least one terminal device, the first AMF network element serves the at least one terminal device, and the at least one terminal device accesses a network by using an integrated access and backhaul IAB node. The processing unit 1020 is configured to perform path handover on the at least one terminal device based on the first request information. The first request information includes at least one first request message, and the at least one first request message is in one-to-one correspondence with the at least one terminal device.

In a possible implementation, the processing unit 1220 is further configured to obtain IAB identification information, where the IAB identification information identifies the IAB node.

In a possible implementation, the processing unit 1220 is further configured to determine a same session management function SMF network element for the at least one terminal device based on the IAB identification information.

In a possible implementation, the receiving unit 1210 is further configured to receive second request information, where the second request information is used to request to register with the first AMF network element, and the second request information includes the IAB identification information.

In a possible implementation, the receiving unit 1210 is further configured to receive third request information, where the third request information is used to request to establish a packet data unit PDU session, and the third request information includes the IAB identification information.

In a possible implementation, the processing unit 1220 is further configured to store a correspondence between the IAB identification information, identification information of the at least one terminal device, identification information of the SMF network element, and identification information of the PDU session.

In a possible implementation, the first AMF network element further includes: the sending unit 1230, configured to send first session information to the SMF network element based on the correspondence, where the first session information is used to create or update a context of a PDU session of the at least one terminal device. The first session information includes at least one first session message, and the first session message is in one-to-one correspondence with the at least one terminal device.

In a possible implementation, the first session information includes the IAB identification information.

In a possible implementation, the first request information includes the JAB identification information, and the IAB identification information identifies the IAB node.

Figure 13:
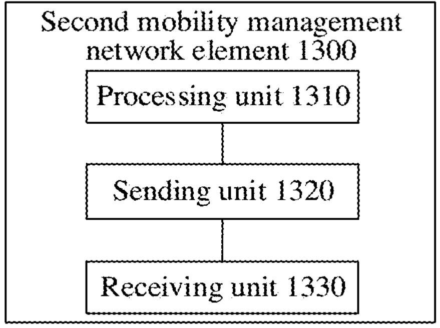
FIG. 13 is a block diagram of a second mobility management network element according to an embodiment of this application.

FIG. 13 is a block diagram of a second mobility management network element 1300 according to an embodiment of this application. It should be understood that the second mobility management AMF network element 1300 includes a processing unit 1310, a sending unit 1320, and a receiving unit 1330.

The processing unit 1310 is configured to obtain a correspondence between identification information of at least one terminal device and identification information of a first AMF network element, where the at least one terminal device accesses a network by using an integrated access and backhaul IAB node, and the first AMF network element serves the at least one terminal device. The sending unit 1320 is configured to send first request information, where the first request information notifies the first AMF network element to perform path handover on the at least one terminal device. The first request information includes at least one first request message, and the at least one first request message is in one-to-one correspondence with the at least one terminal device.

In a possible implementation, the second AMF network element further includes: the receiving unit 1330, configured to receive the first request information, where the first request information includes the correspondence between the identification information of the at least one terminal and the identification information of the first AMF network element.

In a possible implementation, the receiving unit 1330 is configured to receive the correspondence that is between the identification information of the at least one terminal and the identification information of the first AMF network element and that is sent by an access network device.

Figure 14:
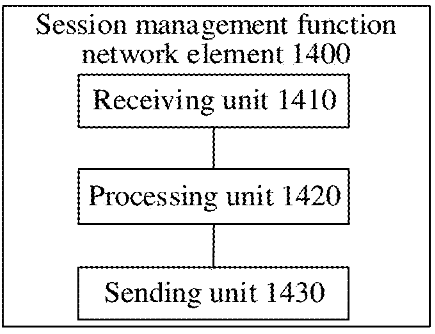
FIG. 14 is a block diagram of a session management function network element according to an embodiment of this application.

FIG. 14 is a block diagram of a session management network element 1400 according to an embodiment of this application. It should be understood that the session management network element 1400 includes a receiving unit 1410, a processing unit 1420, and a sending unit 1430.

The receiving unit 1410 is configured to receive first session information, where the first session information is used to create or update a context of a packet data unit PDU session of at least one terminal device. The first session information includes at least one first session message, and the first session message is in one-to-one correspondence with the at least one terminal device.

In a possible implementation, the first session information includes JAB identification information, the IAB identification information identifies an JAB node, and the at least one terminal device accesses a network by using the IAB node. The session management network element further includes: the processing unit 1420, configured to determine a same user plane function UPF network element for the PDU session of the at least one terminal device based on the IAB identification information.

In a possible implementation, the session management network element further includes: the sending unit 1430, configured to send second session information to the UPF network element, where the second session information is used to update an N4 session context of the UPF network element. The second session information includes at least one second session message, and the second session message is in one-to-one correspondence with the PDU session of the at least one terminal device.

In a possible implementation, the processing unit 1420 is further configured to store a correspondence between identification information of the at least one terminal device, the IAB identification information, identification information of the PDU session, and identification information of the UPF network element.

Figure 15:
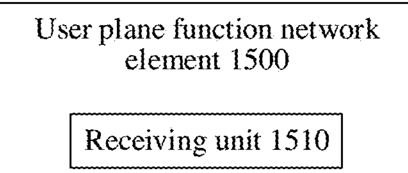
FIG. 15 is a block diagram of a user plane function network element according to an embodiment of this application.

FIG. 15 is a block diagram of a user plane function network element 1500 according to an embodiment of this application. It should be understood that the user plane function network element 1500 includes a receiving unit 1510.

The receiving unit 1510 is configured to receive second session information, where the second session information is used to update an N4 session context of the user plane function UPF network element. A processing unit is configured to update an N4 session context of a packet data unit PDU session of at least one terminal device based on the second session information, where the at least one terminal device accesses a network by using an IAB node. The second session information includes at least one second session message, and the second session message is in one-to-one correspondence with the PDU session of the at least one terminal device.

It should be understood that division into the units in the communication apparatus is merely logical function division. During actual implementation, all or some of the units may be integrated into one physical entity, or may be physically separated. In addition, all units in the communication apparatus may be implemented in a form of invoking software by using a processing element or may be implemented in a form of hardware, or some units may be implemented in a form of invoking software by using a processing element, and some units may be implemented in a form of hardware. For example, each unit may be a separately disposed processing element, or may be integrated into a chip of the communication apparatus for implementation. In addition, each unit may alternatively be stored in a memory in a form of a program to be invoked by a processing element of the communication apparatus to perform a function of the module. In addition, all or some of the units may be integrated, or may be implemented independently. The processing element herein may also be referred to as a processor, and may be an integrated circuit having a signal processing capability. In an implementation process, steps in the foregoing methods or the foregoing units may be implemented by using a hardware integrated logic circuit in a processor element, or may be implemented in the form of invoking software by using a processing element.

In an example, the unit in any one of the foregoing communication apparatuses or network elements may be one or more integrated circuits configured to implement the foregoing methods, for example, one or more application-specific integrated circuits (application-specific integrated circuit, ASIC), or one or more microprocessors (digital signal processor, DSP), or one or more field programmable gate arrays (field programmable gate array, FPGA), or a combination of at least two of these integrated circuit forms. For another example, when the units in the communication apparatus or the network element may be implemented in a form of scheduling a program by a processing element, the processing element may be a general-purpose processor, for example, a central processing unit (central processing unit, CPU) or another processor that can invoke the program. For still another example, the units may be integrated and implemented in a form of a system-on-a-chip (system-on-a-chip, SoC).

Figure 16:
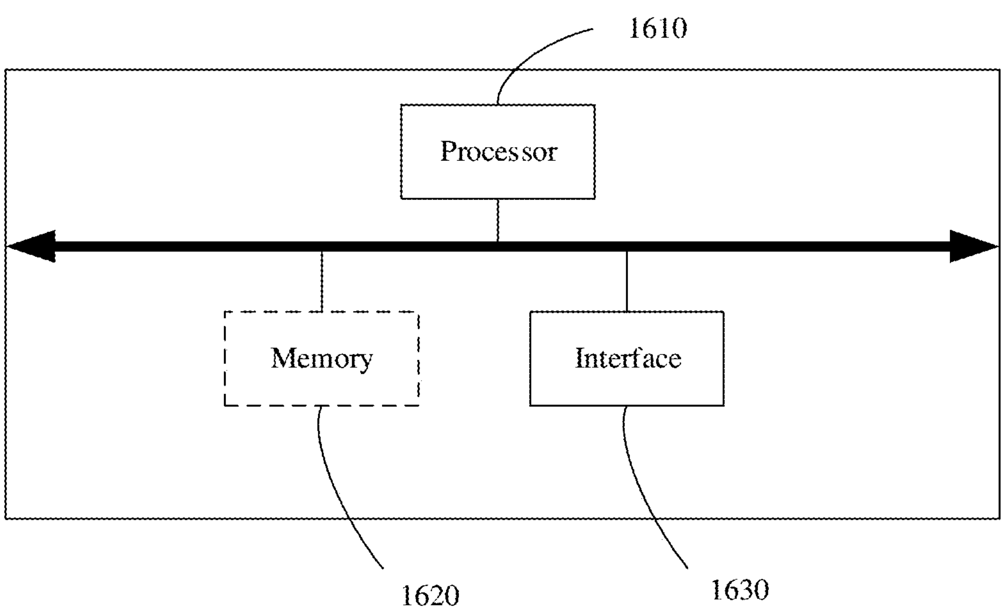
FIG. 16 is a diagram of a structure of an apparatus according to an embodiment of this application.

FIG. 16 is a diagram of a communication apparatus according to an embodiment of this application. The communication apparatus is configured to implement operations of the access network device, the first mobility management network element, the second mobility management network element, the session management network element, and the user plane function network element in the foregoing embodiments. As shown in FIG. 16, the communication apparatus includes a processor 1610 and an interface 1630. The processor 1610 is coupled to the interface 1630. The interface 1630 is configured to implement communication with another device. The interface 1630 may be a transceiver or an input/output interface. The interface 1630 may be, for example, an interface circuit. Optionally, the communication apparatus further includes a memory 1620, configured to store instructions executed by the processor 1610, or store input data required by the processor 1610 to run the instructions, or store data generated after the processor 1610 runs the instructions.

The methods performed by the access network device, the first mobility management network element, the second mobility management network element, the session management network element, and the user plane function network element in the foregoing embodiments may be implemented by the processor 1610 by invoking a program stored in a memory (which may be the memory 1620 in the access network device, the first mobility management network element, the second mobility management network element, the session management network element, or the user plane function network element, or may be an external memory). In other words, the access network device, the first mobility management network element, the second mobility management network element, the session management network element, and the user plane function network element may include the processor 1610. The processor 1610 invokes the program in the memory, to perform the methods performed by the access network device, the first mobility management network element, the second mobility management network element, the session management network element, and the user plane function network element in the foregoing method embodiments. The processor herein may be an integrated circuit having a signal processing capability, for example, a CPU. The access network device, the first mobility management network element, the second mobility management network element, the session management network element, and the user plane function network element may be implemented by configuring one or more integrated circuits for implementing the foregoing methods, for example, one or more ASICs, one or more microprocessors DSPs, one or more FPGAs, or a combination of at least two of the integrated circuit forms. Alternatively, the foregoing implementations may be combined.

Specifically, functions/implementation processes of the units in FIG. 11 to FIG. 15 may be implemented by the processor 1610 in the communication apparatus 1600 shown in FIG. 16 by invoking the computer-executable instructions stored in the memory 1420. Alternatively, functions/implementation processes of the processing unit in FIG. 11 to FIG. 15 may be implemented by the processor 1610 in the communication apparatus 1600 shown in FIG. 16 by invoking the computer-executable instructions stored in the memory 1620, and functions/implementation processes of the receiving unit or the sending unit in FIG. 11 to FIG. 15 may be implemented by the interface 1630 in the communication apparatus 1600 shown in FIG. 16.

It should be understood that the processing unit in the apparatus includes a processor. The processor is coupled to a memory. The memory is configured to store a computer program or instructions and/or data. The processor is configured to execute the computer program or the instructions and/or the data stored in the memory, so that the method in the foregoing method embodiment is executed.

It should be further understood that division into the units in the apparatus is merely logical function division. During actual implementation, all or some of the units may be integrated into one physical entity, or may be physically separated. In addition, all units in the apparatus may be implemented in a form of invoking software by using a processing element or may be implemented in a form of hardware, or some units may be implemented in a form of invoking software by using a processing element, and some units may be implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. The processing element herein may also be referred to as a processor, and may be an integrated circuit having a signal processing capability. In an implementation process, steps in the foregoing methods or the foregoing units may be implemented by using a hardware integrated logic circuit in a processor element, or may be implemented in the form of invoking software by using a processing element.

An embodiment of this application further provides a communication system. The system includes the access network device, the first mobility management network element, the second mobility management network element, the session management network element, and the user plane function network element.

An embodiment of this application further provides a computer-readable medium, configured to store computer program code. A computer program includes instructions used to perform the communication method in the embodiment of this application in the foregoing methods. The readable medium may be a read-only memory (ROM) or a random access memory (RAM). This is not limited in embodiments of this application.

This application further provides a computer program product. The computer program product includes instructions. When the instructions are executed, an access network device, a first mobility management network element, a second mobility management network element, a session management network element, and a user plane function network element are enabled to perform operations corresponding to the access network device, the first mobility management network element, the second mobility management network element, the session management network element, and the user plane function network element in the foregoing methods.

An embodiment of this application further provides a system chip. The system chip includes a processing unit and a communication unit. The processing unit may be, for example, a processor. The communication unit may be, for example, an input/output interface, a pin, a circuit, or the like. The processing unit may execute computer instructions, so that a chip in the communication apparatus performs any one of the communication methods provided in the foregoing embodiments of this application.

Optionally, the computer instructions are stored in a storage unit.

Optionally, the storage unit is a storage unit in the chip, for example, a register or a cache. Alternatively, the storage unit may be a storage unit that is in a terminal and that is located outside the chip, for example, a ROM or another type of static storage device that can store static information and instructions, or a RAM. Any processor mentioned above may be a CPU, a microprocessor, an ASIC, or one or more integrated circuits configured to control program execution of the feedback information transmission method. The processing unit and the storage unit may be decoupled, are disposed on different physical devices, and are connected in a wired or wireless manner to implement respective functions of the processing unit and the storage unit, to support the system chip in implementing various functions in the foregoing embodiments. Alternatively, the processing unit and the memory may be coupled to a same device.

It may be understood that the memory in embodiments of this application may be a volatile memory or a non-volatile memory, or may include a volatile memory and a non-volatile memory. The non-volatile memory may be a ROM, a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a RAM, and serves as an external cache. There are a plurality of different types of RAMs, such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

A person of ordinary skill in the art may be aware that, in combination with the examples described in embodiments disclosed in this specification, units and algorithm steps may be implemented by using electronic hardware or a combination of computer software and electronic hardware. Whether these functions are performed by using hardware or hardware driven by computer software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one place, or may be distributed on a plurality of network units. Some or all of the units may be selected based on actual requirements to achieve the objectives of the solutions of embodiments.

In addition, function units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, applied to an access network device, the method comprising:

determining that at least one terminal device is handed over from a first access network device to a second access network device, wherein the at least one terminal device accesses a network through a first device;

sending first request information, wherein the first request information notifies a first mobility management network element to perform path handover on the at least one terminal device, and the first mobility management network element serves the at least one terminal device, wherein the first request information comprises at least one first request message, and the at least one first request message is in one-to-one correspondence with the at least one terminal device;

obtaining first device identification information, wherein the first device identification information identifies the first device;

determining a same first mobility management network element for each of the at least one terminal device based on the first device identification information; and storing a correspondence between the first device identification information, identification information of the at least one terminal device, and identification information of the first mobility management network element, wherein sending the first request information comprises sending the first request information to the first mobility management network element based on the correspondence.

2. The method according to claim 1, wherein the method further comprises:

sending the correspondence between the identification information of the at least one terminal device and the identification information of the first mobility management network element to a second mobility management network element, wherein the second mobility management network element serves the first device.

3. The method according to claim 1, wherein the method further comprises:

sending second request information to the first mobility management network element, wherein the second request information comprises the first device identification information, and the first device identification information identifies the first device.

4. The method according to claim 1, wherein the first device is an integrated access and backhaul (IAB) node.

5. A method, performed by a first mobility management network element, the method comprising:

receiving first request information, wherein the first request information notifies the first mobility management network element to perform path handover on at least one terminal device, the first mobility management network element serves the at least one terminal device, and the at least one terminal device accesses a network through a first device;

performing path handover on the at least one terminal device based on the first request information, wherein the first request information comprises at least one first request message, and the at least one first request message is in one-to-one correspondence with the at least one terminal device;

obtaining first device identification information, wherein the first device identification information identifies the first device;

storing a correspondence between the first device identification information, identification information of the at least one terminal device, identification information of a session management network element of the at least one terminal device, and identification information of a packet data unit (PDU) session; and sending first session information to the session management network element based on the correspondence, wherein a context of a PDU session of the at least one terminal device is created based on the first session information, wherein the first session information comprises at least one first session message, and the first session message is in one-to-one correspondence with the PDU session of the at least one terminal device.

6. The method according to claim 5, wherein the method further comprises:

determining a same session management network element for each of the at least one terminal device based on the first device identification information.

7. The method according to claim 5, wherein the obtaining first device identification information further comprises:

receiving second request information, wherein the second request information comprises the first device identification information.

8. The method according to claim 5, wherein the first session information comprises the first device identification information.

9. The method according to claim 5, wherein the first device is an integrated access and backhaul (IAB) node.

10. An apparatus, comprising:

at least one processor; and at least one memory coupled to the at least one processor and configured to store programming instructions that, when executed by the at least one processor, cause the apparatus to:

determine that at least one terminal device is handed over from a first access network device to a second access network device, wherein the at least one terminal device accesses a network through a first device;

send first request information, wherein the first request information notifies a first mobility management network element to perform path handover on the at least one terminal device, and the first mobility management network element serves the at least one terminal device, wherein the first request information comprises at least one first request message, and the at least one first request message is in one-to-one correspondence with the at least one terminal device;

obtain first device identification information, wherein the first device identification information identifies the first device;

determine a same first mobility management network element for each of the at least one terminal device based on the first device identification information; and store a correspondence between the first device identification information, identification information of the at least one terminal device, and identification information of the first mobility management network element, wherein sending the first request information comprises sending the first request information to the first mobility management network element based on the correspondence.

11. The apparatus according to claim 10, wherein the programming instructions that, when executed by the at least one processor, further cause the apparatus to:

send the correspondence between the identification information of the at least one terminal device and the identification information of the first mobility management network element to a second mobility management network element, wherein the second mobility management network element serves the first device.

12. The apparatus according to claim 10, wherein the programming instructions that, when executed by the at least one processor, further cause the apparatus to:

send second request information to the first mobility management network element, wherein the second request information comprises the first device identification information, and the first device identification information identifies the first device.

13. The apparatus according to claim 10, wherein the first device is an integrated access and backhaul (IAB) node.

14. The apparatus according to claim 10, wherein the apparatus is an access network device.

* * * * *